United States Patent
Murray et al.

(10) Patent No.: US 9,937,418 B2
(45) Date of Patent: Apr. 10, 2018

(54) COMPUTING DEVICE, GAME, AND METHODS THEREFOR

(71) Applicant: KING.COM LIMITED, St. Julians, MT (US)

(72) Inventors: Christian Murray, Stockholm (SE); Ragnar Svensson, Stockholm (SE); Sebastian Knutsson, Stockholm (SE)

(73) Assignee: KING.COM LTD., St. Julians (MT)

( * ) Notice: Subject to any disclaimer, the term of this patent is extended or adjusted under 35 U.S.C. 154(b) by 781 days.

(21) Appl. No.: 14/186,340

(22) Filed: Feb. 21, 2014

(65) Prior Publication Data
US 2014/0364210 A1    Dec. 11, 2014

Related U.S. Application Data

(63) Continuation-in-part of application No. 14/029,185, filed on Sep. 17, 2013, now abandoned.
(Continued)

(30) Foreign Application Priority Data

Sep. 9, 2013    (GB) .................................. 1316045.2

(51) Int. Cl.
| A63F 13/00 | (2014.01) |
| A63F 13/30 | (2014.01) |
| G07F 17/32 | (2006.01) |

(52) U.S. Cl.
CPC .......... *A63F 13/12* (2013.01); *G07F 17/3272* (2013.01)

(58) Field of Classification Search
CPC .......... A63F 13/46; A63F 13/48; A63F 13/70; A63F 13/79
See application file for complete search history.

(56) References Cited

U.S. PATENT DOCUMENTS

| 5,488,496 A | 1/1996 | Pine |
| 6,068,552 A | 5/2000 | Walker et al. |

(Continued)

FOREIGN PATENT DOCUMENTS

| DE | 10304725 A1 | 9/2004 |
| EP | 1564698 A2 | 8/2005 |

(Continued)

OTHER PUBLICATIONS

Anonymous, "Salesforce Tutorial—Model View Controller (MVC)", [online] Retrieves from the Internet: <https://web.archive.org/web/20130814042919/http://www.salesforcetutorial.com/model-view-controller-mvc/> [retrieved Jul. 1, 2016], Apr. 10, 2013.

(Continued)

*Primary Examiner* — James S McClellan
(74) *Attorney, Agent, or Firm* — Saul Ewing Arnstein & Lehr LLP

(57) ABSTRACT

A computer device is described, comprising a computer storage holding a plurality of identifiers, each associated with an address; an interface connected to receive from a first computer device, game data including a completed first board of a game; and a processor configured to receive the game data to access an address associated with a player identifier and to formulate a message for transmission to a second computer device identified by the address, the message including some or all of the game data, whereby a player at the second computer device receives the message prior to accepting an invitation to play the game. Methods for providing feedback and tile selection are also disclosed in the context of a word matching game.

21 Claims, 22 Drawing Sheets

Related U.S. Application Data

(60) Provisional application No. 61/832,348, filed on Jun. 7, 2013.

(56) References Cited

U.S. PATENT DOCUMENTS

| | | |
|---|---|---|
| 6,117,013 A | 9/2000 | Eiba |
| 7,073,792 B2 | 7/2006 | Esposito et al. |
| 7,749,060 B1 | 7/2010 | Olmes et al. |
| 8,002,633 B2 | 8/2011 | Shimizu et al. |
| 8,075,404 B2 | 12/2011 | Stamper et al. |
| 8,088,010 B1 | 1/2012 | Hill et al. |
| 8,237,743 B2 | 8/2012 | Csurka et al. |
| 8,277,320 B1 | 10/2012 | Hart et al. |
| 8,369,873 B2 | 2/2013 | Krasner et al. |
| 8,388,446 B1 | 3/2013 | Craine et al. |
| 8,526,490 B2 | 9/2013 | Buckley et al. |
| 8,672,744 B1 | 3/2014 | Steere et al. |
| 8,711,923 B2 | 4/2014 | Buckley et al. |
| 8,727,893 B2 | 5/2014 | Otremba et al. |
| 8,784,181 B2 | 7/2014 | Frank et al. |
| 8,964,830 B2 | 2/2015 | Perlman et al. |
| 9,033,803 B1 | 5/2015 | Etter et al. |
| 2002/0068632 A1 | 6/2002 | Dunlap et al. |
| 2002/0082068 A1 | 6/2002 | Singhal et al. |
| 2002/0094870 A1 | 7/2002 | Murray |
| 2003/0049592 A1 | 3/2003 | Park et al. |
| 2003/0074416 A1 | 4/2003 | Bates et al. |
| 2003/0119581 A1 | 6/2003 | Cannon et al. |
| 2004/0053688 A1 | 3/2004 | Hosaka et al. |
| 2004/0137987 A1 | 7/2004 | Nguyen et al. |
| 2004/0224772 A1 | 11/2004 | Canessa et al. |
| 2005/0256985 A1 | 11/2005 | Shea |
| 2006/0068876 A1 | 3/2006 | Kane et al. |
| 2006/0160620 A1 | 7/2006 | Matthews et al. |
| 2006/0223635 A1 | 10/2006 | Rosenberg et al. |
| 2006/0277474 A1 | 12/2006 | Robarts et al. |
| 2006/0281541 A1 | 12/2006 | Nguyen et al. |
| 2006/0287098 A1 | 12/2006 | Morrow et al. |
| 2007/0077993 A1 | 4/2007 | Midgley et al. |
| 2007/0259709 A1 | 11/2007 | Kelly et al. |
| 2008/0005353 A1 | 1/2008 | Panabaker et al. |
| 2009/0170608 A1 | 7/2009 | Herrmann et al. |
| 2009/0203415 A1 | 8/2009 | Falciglia et al. |
| 2009/0209311 A1 | 8/2009 | Bennett et al. |
| 2010/0144426 A1 | 6/2010 | Winner et al. |
| 2010/0151934 A1 | 6/2010 | Kniberg et al. |
| 2010/0218135 A1 | 8/2010 | Brugler et al. |
| 2010/0227675 A1 | 9/2010 | Luxton et al. |
| 2010/0271367 A1 | 10/2010 | Vaden et al. |
| 2010/0317437 A1 | 12/2010 | Berry et al. |
| 2011/0014977 A1 | 1/2011 | Yamazaki et al. |
| 2011/0053681 A1 | 3/2011 | Goldman et al. |
| 2011/0111835 A1 | 5/2011 | Cohen et al. |
| 2011/0136561 A1 | 6/2011 | Acres et al. |
| 2011/0136572 A1 | 6/2011 | Karn et al. |
| 2011/0230246 A1* | 9/2011 | Brook .................... A63F 3/0421 463/9 |
| 2011/0269532 A1 | 11/2011 | Shuster et al. |
| 2012/0030094 A1 | 2/2012 | Khalil et al. |
| 2012/0040752 A1 | 2/2012 | Koo et al. |
| 2012/0064969 A1 | 3/2012 | Uchibori et al. |
| 2012/0077580 A1 | 3/2012 | Mahajan et al. |
| 2012/0079126 A1 | 3/2012 | Evans et al. |
| 2012/0122552 A1 | 5/2012 | Youm et al. |
| 2012/0191606 A1 | 7/2012 | Milne et al. |
| 2012/0198417 A1 | 8/2012 | Haviv et al. |
| 2012/0309539 A1* | 12/2012 | Smith .................... A63F 13/795 463/42 |
| 2012/0311036 A1* | 12/2012 | Huhn .................... G06Q 10/10 709/204 |
| 2013/0035164 A1 | 2/2013 | Osvald et al. |
| 2013/0109469 A1 | 5/2013 | Hill et al. |
| 2013/0172061 A1 | 7/2013 | Iosilevsky et al. |
| 2013/0267285 A1 | 10/2013 | Kelley et al. |
| 2013/0316832 A1 | 11/2013 | Olofsson et al. |
| 2013/0323697 A1 | 12/2013 | Shadduck et al. |
| 2013/0331162 A1 | 12/2013 | Krivicich et al. |
| 2014/0024450 A1 | 1/2014 | Ramachandran et al. |
| 2014/0080600 A1 | 3/2014 | Knutsson et al. |
| 2014/0235338 A1 | 8/2014 | Hansson et al. |
| 2014/0252987 A1 | 9/2014 | Hinrichs et al. |
| 2014/0342791 A1 | 11/2014 | Valeriano et al. |
| 2014/0357367 A1 | 12/2014 | Lee |
| 2014/0370950 A1 | 12/2014 | Jaksch et al. |
| 2015/0050997 A1 | 2/2015 | Suzman et al. |
| 2015/0174489 A1 | 6/2015 | Evald et al. |

FOREIGN PATENT DOCUMENTS

| | | |
|---|---|---|
| EP | 1870143 A1 | 12/2007 |
| EP | 2211299 A2 | 7/2010 |
| JP | 2005-228086 | 8/2005 |
| JP | 2012-61060 A | 3/2012 |
| WO | WO01/46790 A2 | 6/2001 |
| WO | 2006/052212 A1 | 5/2006 |
| WO | 2007/078533 A2 | 7/2007 |
| WO | WO 2007/078533 | 7/2007 |
| WO | WO 2008/109685 A2 | 9/2008 |
| WO | 2009/029108 A1 | 3/2009 |
| WO | 2010/002897 | 1/2010 |
| WO | WO 2010/045716 A1 | 4/2010 |
| WO | 2010/083346 A1 | 7/2010 |
| WO | WO 2010/096784 A1 | 8/2010 |
| WO | 2011/011466 A1 | 1/2011 |
| WO | 2011/041467 A2 | 4/2011 |
| WO | 2012/013198 A1 | 2/2012 |
| WO | WO 203/174933 | 11/2013 |

OTHER PUBLICATIONS

Adbang, "[Flow to block Anipang heart] HOw to block Anipang heart at i-phone", Internet blog, Internet: URL:http://blog.naver.com/cyco5202/110147101106, Sep. 11, 2012.

Goad, ""Why King.com's Candy Crush is crushing it on Facebook"", Games.com [online], Internet: URL:http://blog.games.com/2012/05/01/why-king-comes-candy-crush-is-crushing-it-onfacebook/, May 1, 2012.

Kangbelief, ""Kakao talk, how to reject the undesired invitation message of Anipang and receive the heart quietly"", Internet blog, Internet: URL:http://kangbelief.tistory.com/312, Sep. 16, 2012.

Anonymous, "Amazon Survival YouTube video, Uploaded to YouTube on Mar. 13, 2009, video length 6:06", https://www.youtube.com/watch?v=8S2gM5POUUk, Mar. 13, 2009, 1.

Anonymous, "Bejeweled 2 Wikipedia Article", Sep. 30, 2015, 1-3.

Anonymous, "Bejeweled article", Wikipedia, Sep. 30, 2015.

Anonymous, "Best iOS/Android cross-platform mobiledevelopment SDKs", retrieved from the Internet: URL:http://webification.com/best-iosandroid-cross-platform-mobile-development-sdks [retrieved on Jul. 2, 2013] XP055069062, Sep. 26, 2011, p. 1.

Anonymous, "Bubble Witch Saga—GameSpot", Retrieved from the Internet: URL:http://www.gamespot.co/bubble-witch-saga/ [retrieved on Mar. 21, 2014] XP055109245, pp. 1-2.

Anonymous, "Buck Rodgers Turn Based Strategy Game Design and Planning Document", https://cs.nyu.edu/courses/spring07/V22.0474.001/groups/tbsgame/tbsgame_des.pdf, Feb. 21, 2007.

Anonymous, "Candy Crush Saga Facebook Game levels 1-10 video on YouTube, YouTube screen shorts figures 1-7", https://www.youtube.com/watch?v=8TIeNDrJiN8, Apr. 15, 2012.

Anonymous, "Candy Crush Saga for Facebook, YouTube video demonstrating levels 1-10, video length 15:23", https://www.youtube.com/watch?v=cfqHVkWX5yE, Apr. 12, 2012, 1 page.

Anonymous, "Candy Crush Saga on Facebook Review on YouTube video, Screen shots of YouTube video, figures 1-13", https://www.youtube.com/watch?v=AbH8Givg6XM, Sep. 7, 2012.

Anonymous, "Cross-platform", retrieved from the Internet: URL:http://en.widipedia.org/w/index.php?title=Cross-platform &oldid=487867404 [retrieved on Jul. 1, 2013] XP055068984, Apr. 17, 2012, pp. 1-16.

(56) References Cited

OTHER PUBLICATIONS

Anonymous, "Daily Bonus Level Oct. 17, 2012: Bubble Witch Saga Fan Site", retrieved from the Internet:URL:http://bubble-witch-saga.se/daily-bonus-level-17-oct-2012/ [retrieved on Mar. 21, 2014] XP055109244, Oct. 17, 2012, pp. 1-2.
Anonymous, "Dig Dug article", Wikipedia, Sep. 30, 2015.
Anonymous, "Facebook Platform—Wikipedia, the free encyclopedia", Retrieved from the Internet: URL:http://en.wikipedia.org/w/index/php?title=Facebook_Platofrm&oldid=533105338 [retrieved on Mar. 21, 2014] XP055109249, pp. 1-2.
Anonymous, "Facebook Spiel Candy Crush Saga: Cheats, Tipps, News und Videos BILDspielt", URL: http://www.bildspielt.de/social-games/3-gewinnt/candy-crush-saga-180643/ [retrieved on Oct. 25, 2013] XP055085339, Apr. 12, 2012, pp. 1-10.
Anonymous, "Game Architecture: Model-View-Controller", retrieved from the Internet: URL:http://www.koonsolo.com/news/model-view-controller-for-games/ [retrieved on Oct. 8, 2013] XP055083073, Jul. 13, 2009, pp. 1-2.
Anonymous, "Guide to Bubble Witch Saga—Facebook Hints & Tips—How to level guide", retrieved from the Internet: URL:http://reindeerz.hubpags.com/hub/Bubblewitch [retrieved on Dec. 9, 2012] XP055092347, Apr. 10, 2012, pp. 1-2.
Anonymous, "iPhone Game 'Trism' break $250,000. Review.— [Updated] razorianflyofficial", retrieved from the Internet: URL: https://razorianflyofficial.wordpress.com/2008/09/25/iphone-game-trism-breaks-25000-review/, [retrieved on Apr. 15, 2015] XP055183153, Sep. 26, 2008.
Anonymous, "King.com expands to Google+ with Bubble Witch Saga", Retrieved from the Internet: URL:http://www.insidesocialgames.com/2012/01/24/king-com-expands-to-google-with-bubble-witch-saga/ [retrieved on Mar. 21, 2014] XP055109246, Jan. 24, 2012, pp. 1-2.
Anonymous, "King.com Skill Games for iPhone and Facebook: http://www.ubergizmo.com/2009/07/king-com-skill-games-for-iphone-and-facebook/", retrieved from the Internet: URL:http://www.google.de/imgres?client=firefox-a&hs=0gJ&sa=X&rls=org.mozilla:en-GB:official&biw=1680&bih=858&tbm=isch&tbnid=Dp0hnHVKMxtoUM:&imgrefurl=http://www.ubergizmo.com/2009/07/king-com-skill-games-for-iphone-and-faceboo, Jul. 13, 2009, pp. 1-2.
Anonymous, "Minecraft", retrieved from the Internet: URL:http://en.widipedia.org/w/index?title=Minecraft&oldid=409326251 [retrieved on Jul. 1, 2013] XP055068987, May 2, 2014.
Anonymous, "Model-view-controller", retrieved from the Internet: URL:http://en.widipedia.org/w/index/php?title=Model%E2%80%93view%E2%80%93controller&oldid=511810952 retrieved on Oct. 8, 2013] XP055083072, Sep. 11, 2012, pp. 1-2.
Anonymous, "OpenOffice, Creating Charts and Graphs", Dec. 2004, 1-17.
Anonymous, "Pygame", retrieved from the Internet: URL:http://web.archive/org/web/20120413123244/http://www.pygame.org/wiki/tut_design [retrieved on Oct. 8, 2013 XP055083074, Apr. 13, 2012, pp. 1-5.
Anonymous, "Search for Play Free Online Games on GamesGames.com Home Action Strategy Bomberman War Games Shoot & Throw Worms Fly & Shoot Run & Shoot Tower Defence Flying Wreck the City Adventure Collect & Run Puzzle & Run Role Playing Games Escaping Jump & Shoot Point", retrieved from the Internet: URL:http://web.archive.org/web/20120621061714/http://www.gamesgames.com/games/social-games/social-games.html [retrieved on Oct. 15, 2013] XP055084089, Jun. 21, 2012, pp. 4-6.
Anonymous, "Why King.com's Candy Crush is crushing it on Facebook", retrieved from the Internet: URL: http://blog.games.com/2012/05/01/why-king-coms-candy-crush-is-crushing-it-on-facebook/ [retrieved on Oct. 25, 2013] XP055085338, May 1, 2012, pp. 1-4.
Collins, "Will Collins Game Spotlight: Candy Crush Saga", retrieved from the Internet: URL:https//developers.facebook.com/blog/post/2012/06/15/game-spotlight--candy-crush-saga/ [retrieved on Oct. 25, 2013] XP055085345, Jun. 15, 2012, pp. 1-2.
Demeter, "Trism: Upcoming iPhone Game by Demiforce", retrieved from the Internet: URL: https://www.youtube.com/watch?v=hy0ptZisr70, [retrieved on Apr. 16, 2015] XP054975820, Feb. 26, 2008.
Dotson, "Bubble Witch Saga Pops Bubbles o iOS and Facebook >148Apps> iPhone, iPad, and iPod touch App Reviews and News", retrieved from the Internet: URL:http://www.148apps.com/news/bubble-witch-saga-pops-bubbles-ios-facebook/ [retrieved on Dec. 9, 2013] XP055092342, Jul. 27, 2012, pp. 1-2.
Duffy, "Home Product Guies Software Internet 7 Great Google+ Games You Might Also Like", retrieved from the Internet: URL:http://www.pcmag.com/article2/0,2817,2391136,00.asp [retrieved on Oct. 15, 2013] XP055084091, Aug. 16, 2011, p. 1.
Josef, "Bloxley Tutorial #1—Sokoban", http://bloxley.net/2010/10/tutorial-1-sokoban, Oct. 13, 2010.
Murphy, "Bejeweled 2 Strategy Guide", www.bigfishgames.com, Aug. 15, 2010.
Namco, "Dig Dug Video Game", 1982.
Popcap, "Bejeweled Video Game", 2001.
Rua, "Candy Crush Saga Gameplay First Look (Episode 1-10 levels)", retrieved from the Internet: URL: https://www.youtube.com/watch?v=8TIeNDnJiN8 [retrieved on Apr. 16, 2015] XP054975821, Apr. 15, 2012.
Schoenau-Fog, "The Player Engagement Process—An Exploration of Continuation Desire in Digital Games", http://www.digra.org/wp--content/uploads/digital-library/11307.06025.pdf, 2011.
Squires, "Bubble Witch Saga is going mobile—Gamezebo", retrieved from the Internet: URL:http://www.gamezebo.com/news/2012/06/27/bubble-witch-saga-going-mobile [retrieved on Dec. 9, 2013] XP055092339, Jun. 27, 2012, pp. 1-2.
International Search Report, dated Jul. 25, 2014, and Written Opinion issued in corresponding International Application No. PCT/EP2014/061920.
Classic Game Room—Bejeweled 3 review for Nintendo DS, screen shot 1 page, video length 4:22; retrieved from the Internet; URL: https://www.youtube.com/watch?v=pxVGdIJTVxQ, Dec. 16, 2011.
Sutek's Tomb on YouTube, Screen shot 2 pages, video length 6:59, retrieved from the Internet: URL: https://www.youtube.com/watch?v=D0Z1FN70SwE, Aug. 12, 2007.

* cited by examiner

DETAILED WORD STATISTICS

| ROUND | WORD | ACCEPTED | 3X LETTER | 2X LETTER | 3X WORD | 2X WORD | SCORE |
|---|---|---|---|---|---|---|---|
| 1 | STEED | yes | | | | | 750 |
| 1 | MINK | yes | | | | | 19 |
| 1 | SAL | yes | | | | | 170 |
| 2 | SHAKE | yes | X | | | | 480 |
| 2 | FUME | yes | | | | | 210 |
| 2 | CRY | yes | | | | | 370 |
| 3 | SQUARES | yes | | | | | 480 |
| 3 | IS | yes | | | | | 90 |
| 3 | RANT | yes | T | | | | 1770 |
| 4 | SIX | yes | | | | O | 90 |
| 4 | BEATS | yes | | | | | 1550 |
| 4 | AL | yes | | | | | 90 |
| 5 | BOOKS | yes | | | | | 190 |
| 5 | YET | yes | | | | | 80 |
| 5 | TIN | yes | | X | | | 80 |
| 6 | MAN | yes | | Y | | X | 3090 |
| 6 | SEXES | yes | | | | | 243 |
| 6 | HEY | yes | | | | | 10483 |
| | Total word score | | | | | | |
| | Time Bonus | | | | | | 264 |
| | Total score | | | | | | 10413 |

Figure 15

COMPUTING DEVICE, GAME, AND METHODS THEREFOR

CROSS-REFERENCE TO RELATED APPLICATIONS

This application is based on, and claims priority to U.S. Provisional Application No. 61/832,348, filed Jun. 7, 2013 and GB Application No. GB 1316045.2, filed on Sep. 9, 2013; and is a continuation-in-part of U.S. application Ser. No. 14/029,185, filed Sep. 17, 2013, the entire contents of each of which is fully incorporated herein by reference.

FIELD OF EMBODIMENTS

The invention relates to computer devices connected in a communications network wherein the computer devices are configured to selectively communicate with each other over the network.

BACKGROUND

One context where computer devices need to selectively communicate is in computer implemented tile based social games. Computer based word tile based games are popular, particularly when played against other players, either with direct local based wired or wireless connections between the computing devices of each player, or via a combination of such connections through a local or wide area network such as the internet. At present, to conduct a game played against another player, an invitation to a selected player is transmitted and a response must be received before play can begin.

SUMMARY OF DISCLOSURE

The inventors have recognised that this may use up unnecessary bandwidth of the network, and can cause players to become disengaged while waiting for a response.

According to a first aspect, there is provided a computer device comprising a computer storage holding a plurality of identifiers, each associated with an address; an interface connected to receive from a first computer device, game data including a completed first board of a game; and a processor configured to receive the game data to access an address associated with a player identifier and to formulate a message for transmission to a second computer device identified by the address, the message including some or all of the game data, whereby a player at the second computer device receives the message prior to accepting an invitation to play the game.

According to a second aspect, there is provided a computer implemented method comprising at least one processor configured to receive from a first computer device, game data including a completed first board of a game; access an address associated with a stored player identifier, and formulate a message for transmission to a second computer device identified by the address, the message including some or all of the game data, whereby a player at the second computer device receives the message prior to accepting an invitation to play the game.

In an embodiment of the above aspects the player identifier may identify the player at the second computer device.

In another embodiment, the processor may be configured to match a player at the first computer device with one of the player identifiers.

In yet another embodiment, the message for transmission to a second computer device may comprise a component for display at the second computer device, and the component may identify a player at the first computer device.

In variations of the above embodiment, the component for display may comprise a text component and/or the component for display may include a score derived from the game data.

In another embodiment, the processor may be configured to transmit the message to multiple second computer devices.

In yet another embodiment, the processor may be configured to receive multiple game boards from the first computer device and to transmit a respective message to each of multiple second computer devices.

In an embodiment the game data may relate to a second game wherein each board comprises a set of letter tiles of which the player has selected adjoining tiles to form each of a plurality of words.

In an embodiment letter tiles which are not used may be subsequently scrambled.

According to a third aspect, there is provided a computer implemented method of generating display data for a computer device, the method comprising generating a set of letter tiles for transmission to a computer device, wherein the tiles are organised in a tray displayed to a user, and wherein a user can select letter tiles to form words; receiving feedback information after a game has been played by a user, the game constituting selecting the tiles to form words; combining the feedback information with feedback information from earlier games played by the same user or by different users, and using the combined feedback information to select a next set of letter tiles to be transmitted to the computer device to be displayed in the tray for subsequent games.

According to another aspect there is provided a computer readable storage device storing instructions that, when executed by at least one processor, causes said at least one processor to perform the following steps, receive from a first computer device, game data including a completed first board of a game; access an address associated with a stored player identifier, and to formulate a message for transmission to a second computer device identified by the address, the message including some or all of the game data, whereby a player at the second computer device receives the message prior to accepting an invitation to play the game.

According to yet another aspect there is provided a computer readable storage device storing instructions that, when executed by at least one processor, causes said at least one processor to perform the following steps, generating a set of letter tiles for transmission to a computer device, wherein the tiles are organised in a tray displayed to a user, and wherein a user can select letter tiles to form words; receiving feedback information after a game has been played by a user, the game constituting selecting the tiles to form words; combining the feedback information with feedback information from earlier games played by the same user or by different users, and using the combined feedback information to select a next set of letter tiles to be transmitted to the computer device to be displayed in the tray for subsequent games.

BRIEF DESCRIPTION OF DRAWINGS

To understand some embodiments, reference will now be made by way of example only to the accompanying drawings, in which:

FIG. 15 depicts a game statistics table of an embodiment;

FIG. 22 is a game screen providing help according to an embodiment.

DETAILED DESCRIPTION OF SOME EMBODIMENTS

The terms user and player are used interchangeably throughout this document and no specific meaning is intended using one or the other unless the context suggests otherwise. A person skilled in the art will realise that the different approaches to implementing the game are not exhaustive, what is described herein are certain preferred embodiments. It is possible to implement the invention in a number of variations without departing from its spirit or scope.

Figure 1:
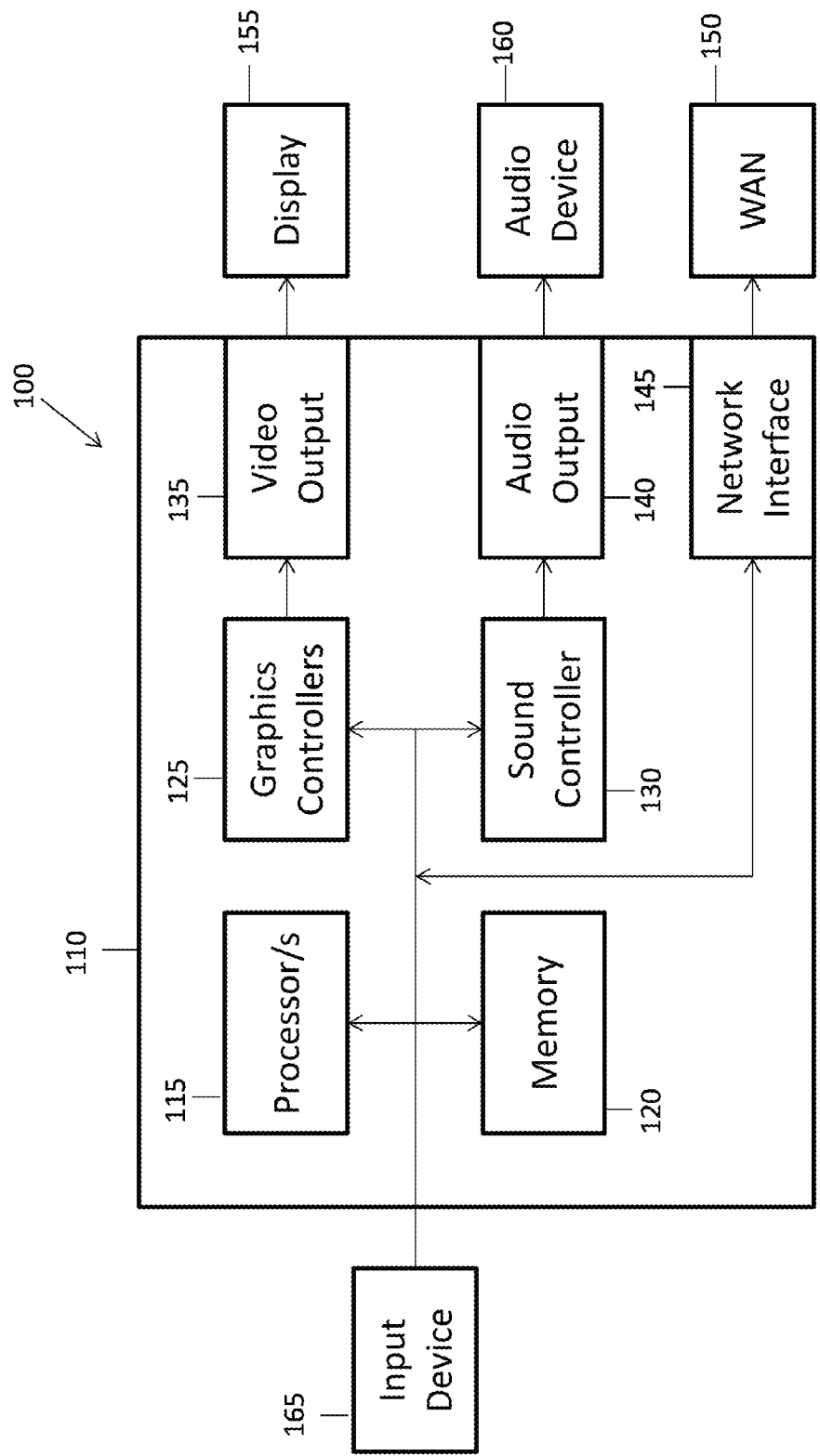
FIG. 1 shows an example computing device of an embodiment.

A schematic view of a user device 100 according to an embodiment is shown in FIG. 1. All of the blocks shown are implemented by suitable circuitry. The blocks may be implemented in hardware and/or software. The user device may have a control part 110. The control part 110 has one or more processors 115 and one or more memories 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and/or earphone(s).

The device 100 has an input device 165. The input device 165 can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
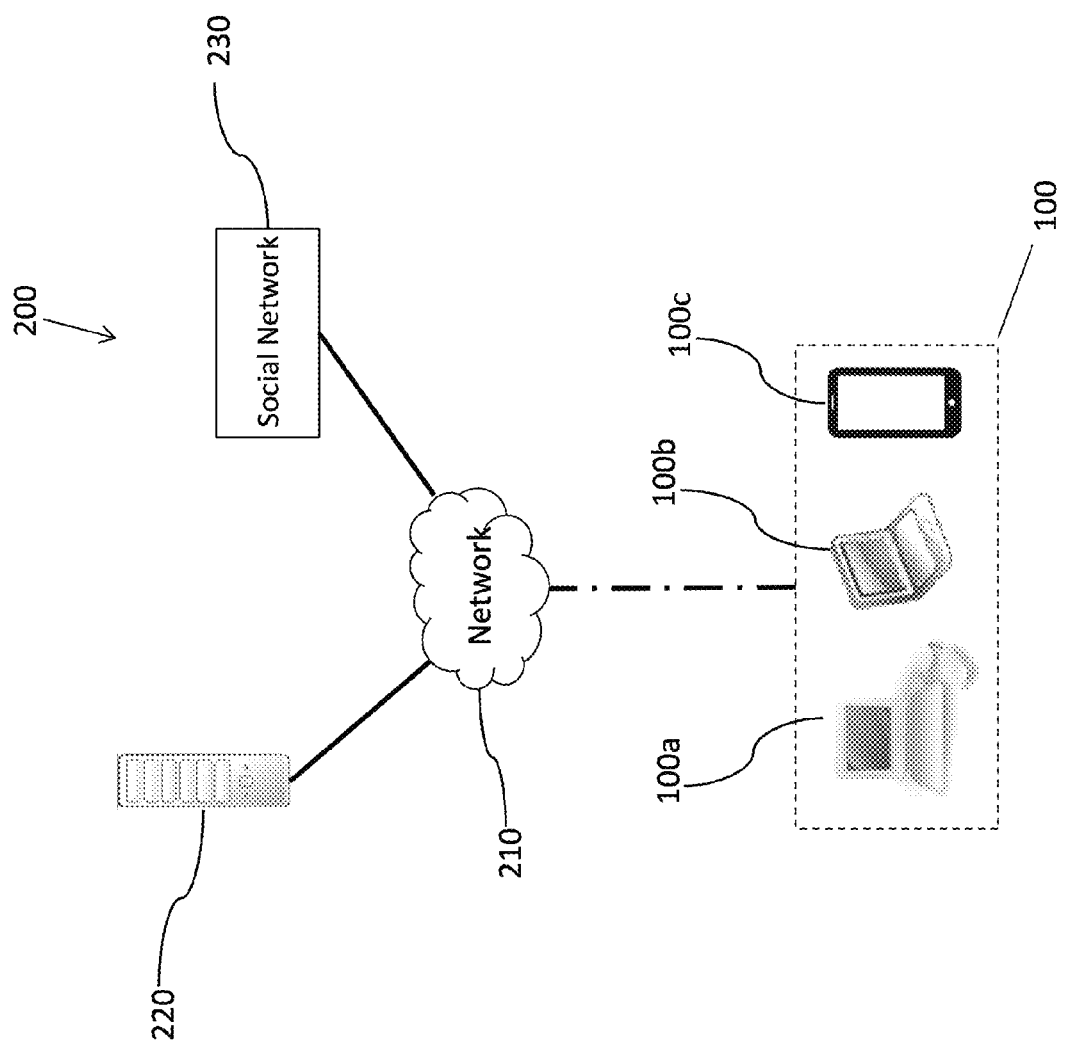
FIG. 2 illustrates an example system in which some embodiments may be provided.

FIG. 2 schematically shows a system 200 in some embodiments. The system 200 comprises a server 220 which may store databases of game player's details, profiles, statistics, etc. In practice, one or more databases may be provided. Where more than one server is provided, the database(s) may be provided in one database or across two or more servers. The server may also have a games data function. This may comprise one or more units of memory to store the computer game program and user behaviour data, and a processor to run the games program and process the user behaviour data.

The server 220 may communicate via for instance the internet 210 to one or more user devices 100, shown in the figure by way of example as user devices 100a, 100b and 100c, and may further provide connections to a social network 230 such as Facebook™.

It should be appreciated that embodiments may be deployed in different system architectures. For example, the computer game may be implemented as a computer game that is stored in the memory 120 of the user device 100 and is run on the processor 115 of the user device 100. However, the server 220 may handle some elements of the game in some embodiments. By way of example only, a Java game applet may be provided to the user device 100 and the locally running Java applet will generate, for example, the graphics, sounds, and user interaction for the game play on the user device 100. Some data may be fed back to the server 220 to allow interaction with other players. The data which is fed back may also allow scoring and/or cross platform synchronization.

In some embodiments, the game may be implemented as a computer program that is stored in a memory of the system, for example the server 220, and which runs on a processor of the game server. Data streams or updates are supplied to the user device 100 to allow the user device 100 to render and display graphics and sounds in a browser of the user device 100. Such an approach is sometimes referred to as a web services approach. It should be appreciated, however, that such an approach does not necessarily require the use of the Internet.

Figure 3:
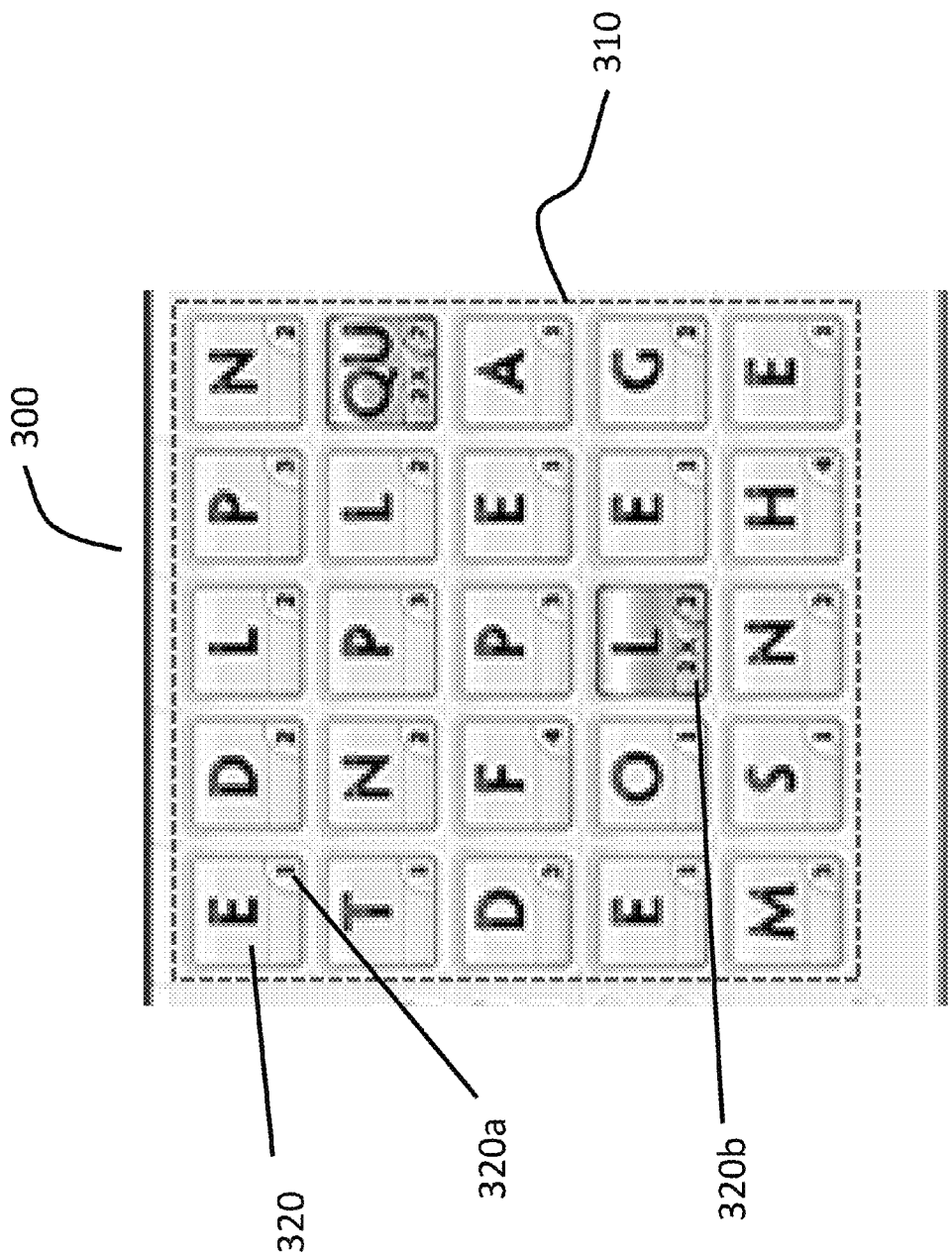
FIG. 3 shows an example game board of an embodiment.

FIG. 3 shows an embodiment of a game 300 displayed to a player. In this embodiment the game is a word puzzle game where the goal may typically comprise, but is not limited to composing the three best scoring words on a game board of twenty five letter tiles 320, 320a, 320b arranged as a square of 5 five by five letter tiles 320. There may be limited time to spell the words and as the words are submitted, the player will progress to the next round and receive a new tile game board 310 comprising different letter tiles 320. In some implementations, the number of words required per level and the amount of tiles on the game board can vary.

There is in a typical implementation only five minutes in total to play through a total of five rounds. Therefore it is important not to waste too much time in each round. If the player spells a long word in each of the five rounds, it may be possible to qualify for a bonus round and receive a chance to increase the score further.

There now follows a brief description of the game 'Word Link', which is presented as an example in which the invention may be implemented. The person skilled in the art will understand that there are many other ways the present ideas can be implemented and the description is not limited to only one implementation.

When the game 300 starts the game board 301 is filled with letter tiles 320. Any letters that are touching each other can be combined into a word. Each letter can only be used once per word and also once per round, so choosing the right combination of words is the aim of the game.

The player should aim to find three words per round. Fewer words may be submitted if the player cannot find sufficient words, and it is possible to change the words up until the words are finally submitted for each round.

A word has to be a certain amount of tiles 320 long to be submitted, for instance 3-10. The letter tiles typically have different values 320a, 320b depending on how common they are in the dictionary for the language being played. Longer words are usually worth relatively more points than shorter words.

In a typical implementation, the player can create words that are in any form, singular or plural, present or past tense and so on. This makes it strategically important to look for the possibilities of creating a longer word with touching letter tiles by using a different form. Combinations of several extensive dictionaries may be used to determine whether or not a word is accepted. In some embodiments abbreviations or names are not accepted. If a word is input that is not found in a dictionary, it will not give any points to the player but neither will it cause the player to lose points.

Score estimates for the words may be displayed as they are spelled out, but the player will not know whether they are accepted by the dictionaries until all words in a round have been submitted.

In a typical implementation, there may be 3 types of bonus tiles for example:

2× Letter: This doubles (320b) the Letter score of the tile.
3× Letter: This triples the Letter score of the tile.
2× Word: This doubles the value of the whole word.
Bonus tiles can be earned by submitting long words that are approved by the dictionaries. In order to receive a 2× Word bonus tile the player needs to submit words that are at least 6 tiles long. Another bonus tile is a "wildcard" feature. For example, a blank tile or a tile with a question mark indicated thereon which the player may use as any letter in the alphabet of the language being played.

In some embodiments, each player can input up to three words per round. The letter tiles 320 the player wishes to link into a word are connected by clicking on them, for instance with the left mouse button if the game is being played on a computer 100a. It can also be possible for the player to click on the first letter of an intended word and then hold the mouse button and drag the pointer over the subsequent letters of the intended word. Touchscreen interfaces may also be employed if present in the computer device 100 (e.g. a mobile phone, tablet or touch enabled laptop or gaming machine) to select tiles 320 and form words.

The letter tiles 320 have to be adjoining to or touching each other to be able to be combined. When a word has been completed, the player can lock the word and move on to forming the next one. In a typical implementation, this is performed by clicking an additional time on the last letter tile. Alternatively the player may click on the next word field to the right to activate the next word. A word that has not yet been locked is pink in colour, which changes to blue when the player locks the word.

A tile may only be used once in a round, so when a tile is already used in one word it cannot be used again in another one.

To submit words and go to the next round, the player can click on an appropriate button or indicator such as a Submit All button.

The word scores are based on several factors, mainly the value of the letter tiles that are linked and how many tiles that are used to form the word. This means that long words with more difficult letters are more valuable.

In one implementation, when a game has been started between two players, it will not end until three rounds have been completed. If player A starts a new game and therefore plays its first round, then player B will not be able to see the result of player A's first round until having finished the same round. In the same way, player A will not be able to start its second round until player B has completed its first round. If for example player B would finish its first round and continue to play its second round before player A has finished its second round, the player B will in turn have to wait for player A until the third round can be started. The game continues the same way until all three rounds have been played, players have to be on the same round in order to be able to play, otherwise they will have to wait for the other player.

Figure 4:
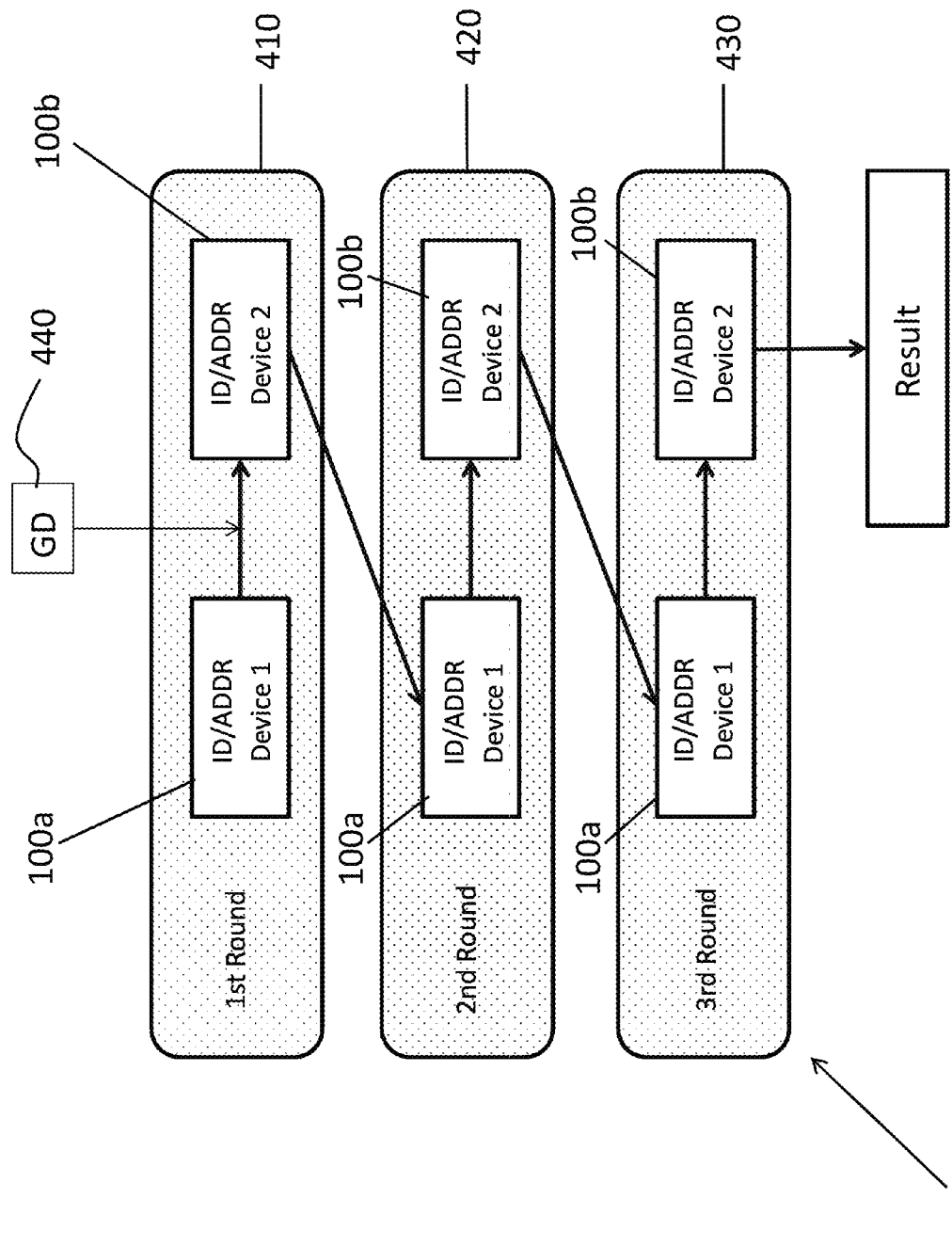
FIG. 4 illustrates schematically interaction between players playing rounds of a game according to an embodiment.

FIG. 4 illustrates a round based game 400 according to an embodiment. Initially, player A, via computer device 100a forms a gameboard 310 having game data 440 comprising at least letter tiles 320. Player A completes the first game board (i.e. selects and scores words from the game board).

Player A's computer device 100a is configured to access an address associated with a player identifier (ID/ADDR) and to formulate a message for transmission to a second computer device 100b of player B identified by the address, the message including some or all of the game data 440, whereby the player B at the second computer device 100b receives the message prior to accepting an invitation to play the game.

In some embodiments the player identifier may identify the player at the second computer device 100b, and the message transmitted to the second computer device 100b may comprise a text component identifying the player at the first computer device 100a.

Once the invitation is accepted by the second computer device 100b, player B may play his turn or turns on the gameboard 310 provided by the first computer device associated with player A, and the game move onto a second round 420, and likewise a third round 430. When both players have finished the third round 430, then the final result will be shown. For example, the device 100a, 100b may show who the winner is and how much both players have earned on each round. The player with the highest total score wins. In order to give the player an incentive to play all rounds, the rounds may have an increased score volatility which gives a better potential for higher scores.

In another embodiment the message from the first computer device 100*a* may be transmitted to multiple second computer devices 100*b*, 100*c* in order to trigger multiple tournaments.

In an embodiment, when choosing to start a new tournament, the player completes a first gameboard 310 and then must find another player to play against.

Figure 5:
FIG. 5 depicts a screen of a game according to an embodiment.

In one implementation this step is called 'Find a Friend!' as depicted in FIG. 5 which illustrates 500 a display 155 showing options available. The player may for example choose to play a random stranger, a friend from a social network such as Facebook, they can choose a rematch against a player they have already played against or by searching for another user via their e-mail address or in some implementation by their user names. In one implementation, the various ways to find a friend alters depending on how the player has logged in. If for example having logged in via their email then only 'Quick game', 'Rematch' and 'E-mail' would be available while if logged in via a social network the 'E-mail' option may disappear.

The user or player identifiers hence may comprise their name, their screen or game name, and are associated with an address that enables the computing device they use to be accessed for invitation messages including a first completed game board.

Figure 6:
FIG. 6 depicts a screen of a game according to an embodiment.
Figure 7:
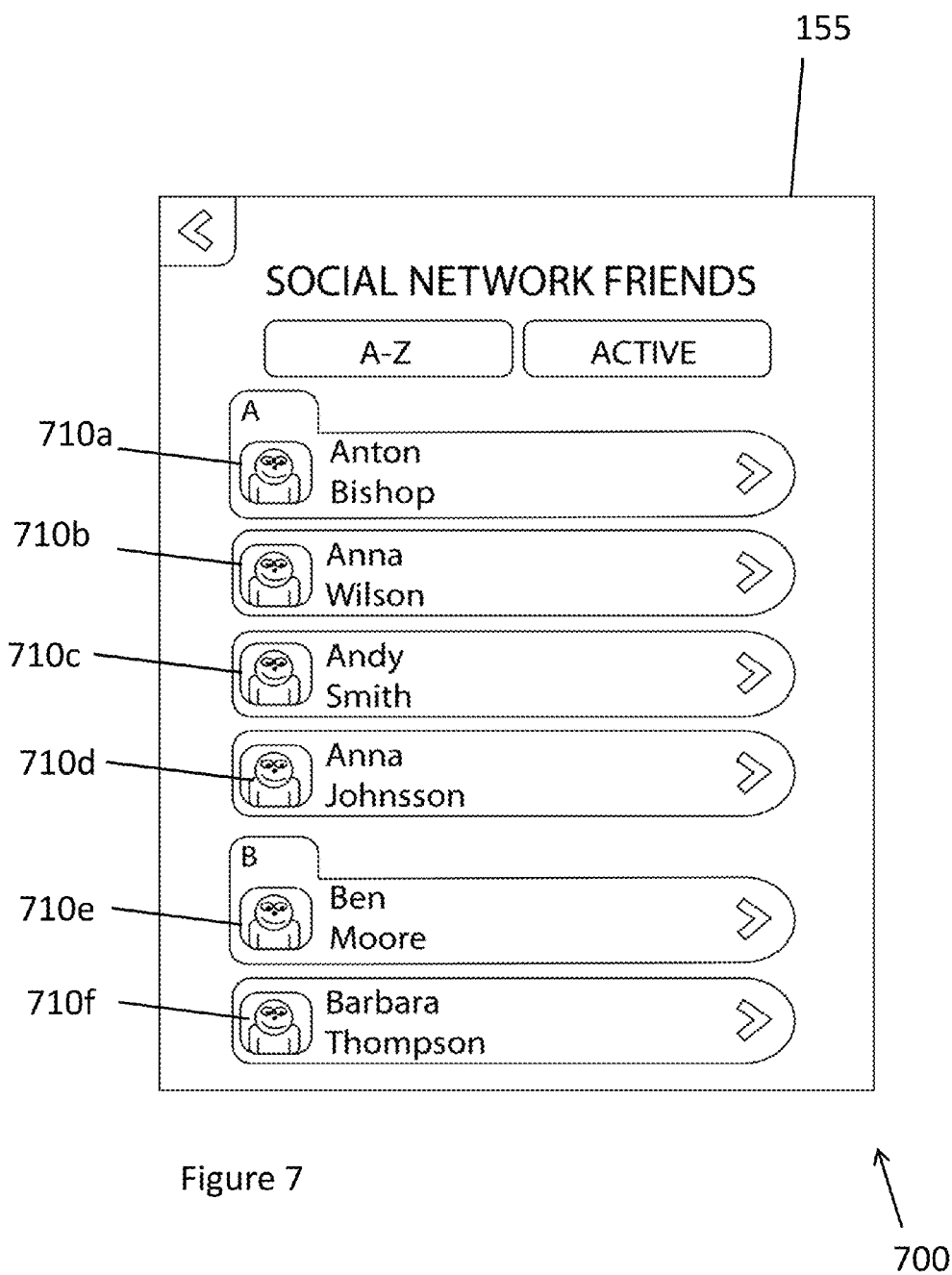
FIG. 7 depicts a screen of a game according to an embodiment.

If wanting to start a rematch then the player will be taken to another view showing a list of what friends they can challenge and start a new tournament with (see FIG. 6 which shows a challenge being displayed 155). In the same way, if wanting to start a new tournament with a friend from a social network then a view showing available friends 700 from that network may be shown as illustrated in FIG. 7. In one implementation, the view showing friends from a social network is designed with a list of names 710*a*, 710*b*, 710*c*, 710*d*, 710*e*, 710*f* in alphabetical order. In the same implementation there is also an option to only view friends that are active on the network filtering out friends that may not see the tournament invitation.

As shown in FIG. 7, there are two players 710*b*, 710*d* called "Anna" being displayed 155. An address associated with the player identifier therefore enables the message comprising some or all of the game data to the sent to the computing device of that player prior to the acceptance of an invitation to play the game.

Figure 8:
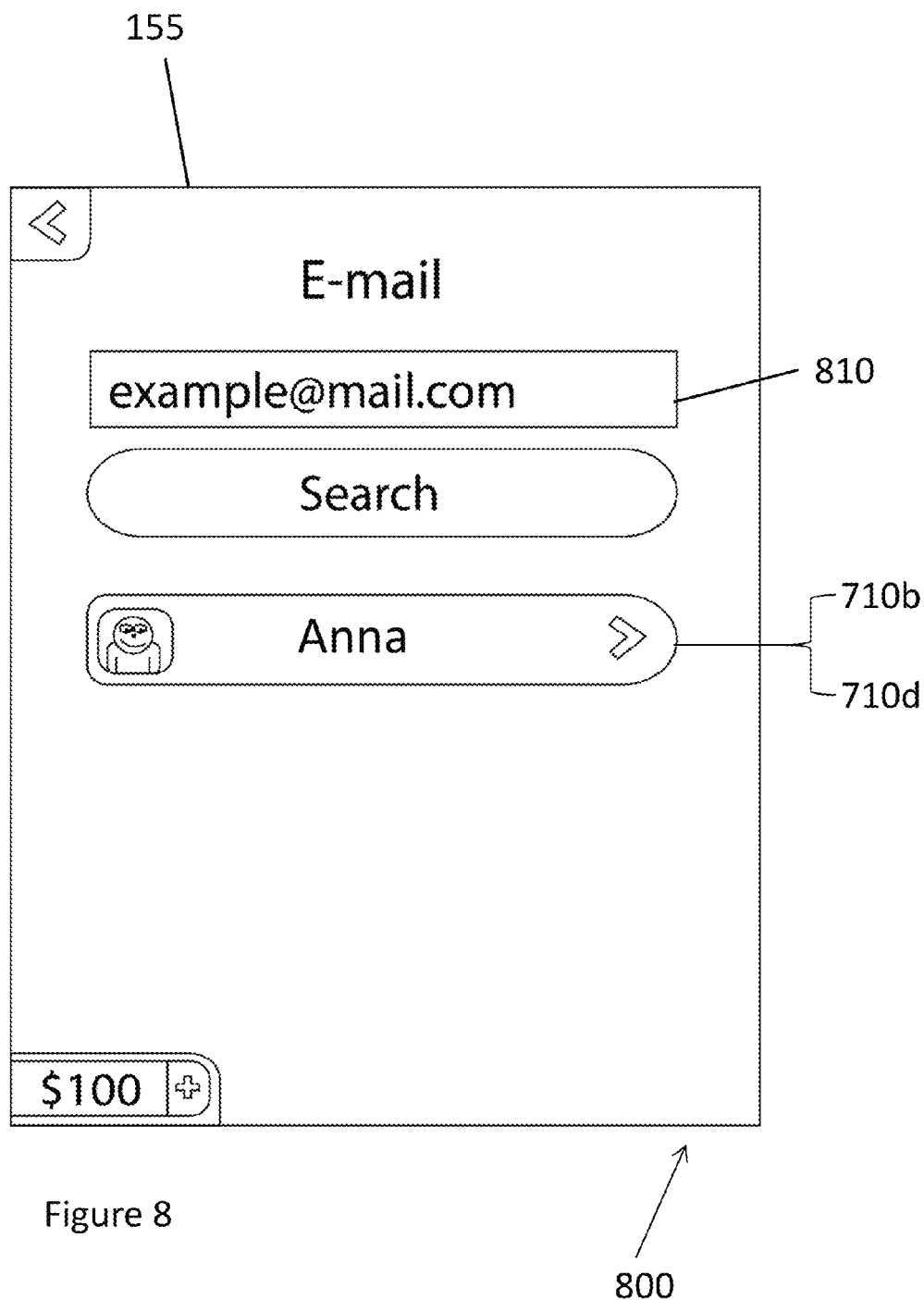
FIG. 8 depicts a screen of a game according to an embodiment.

Knowing a friend's e-mail address can also be helpful if wanting to find a friend to play against 800 as displayed 155 with reference to FIG. 8. The player may type in their friend's e-mail address and if the friend is registered to the system, i.e. the player identifier comprises the friend's email address which may itself identify the friend's or second player's computing device 100*b*, then their name will show up and the player can play his or her first round to provide game data 440 including a completed first board for inclusion in the message received by the player at the second computing device 100*b* prior to accepting the invitation.

The second or multiple players may then choose whether to accept the invite on their respective computing devices 100*a*, 100*b*, 100*c*, based on for example whether they think they have a chance of winning (since the first player has already completed his or her turns on the gameboard 310 prior to inviting), or their perception of how difficult or easy it will be to make words from the gameboard 310.

In another embodiment the device processor(s) 115 and/or the server 220 may be configured to transmit the message to multiple second computer devices 100*b*, 100*c*. Thus the same game board may be used to trigger multiple tournaments.

In another embodiment the device processor(s) 115 and/or the server 220 may be configured to receive multiple game boards 310 from the first computer device 100*a* and to transmit a respective message to each of multiple second computer devices 100*b*, 100*c*. Hence, a single player may instigate multiple game boards.

In another embodiment the game data 440 may relate to a second game wherein each board 310 comprises a set of letter tiles 320 of which the player has selected adjoining tiles to form each of a plurality of words.

In another embodiment the letter tiles 320 which are not used may be subsequently scrambled.

Figure 9:
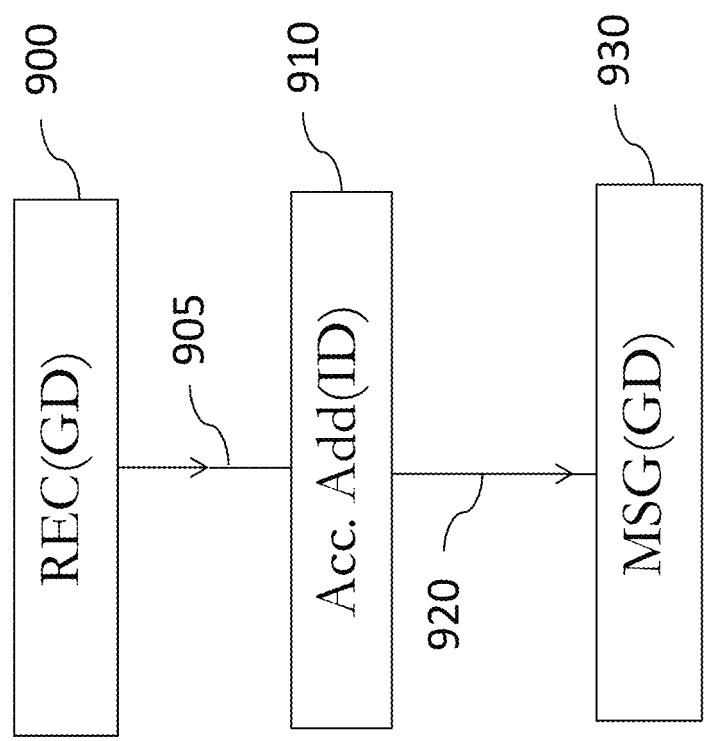
FIG. 9 is a flowchart of a method embodiment.

FIG. 9 illustrates a flow chart of an embodiment of a computer implemented method. At step 900 the system 200, comprising at least one processor (server 220, user device(s) 100*a*, 100*b*, 100*c* processors 115) receives "REC(GD)" from a first computer device 100*a* game data 440 including a completed first board 310 of a game. The process then flows 905 to step 910 wherein the system accesses an address associated with a stored player identifier "Acc. Add(ID)". The process then flows 920 to step 930 wherein a message (MSG(GD)) is formulated for transmission to a second computer device 100*b*, 100*c* identified by the address, the message including some or all of the game data 440, whereby a player at the second computer device receives the message prior to accepting an invitation to play the game.

Hence a player may start playing a round before other players have accepted his or her invite, thereby a quick game is begun and the requirement for a player to wait for an invite before playing is mitigated.

In another embodiment, previous stored data constituting players identifiers, their scores, frequency of play, high scores, percentile rating may be used to select and "match" a player of a first computing device 100*a* with an appropriate player of a second computing device 100*b* and/or a third computing device 100*c*.

Hence a quick game, single or multiple game, or tournament, with player matching features are provided in some embodiments.

Figure 10:
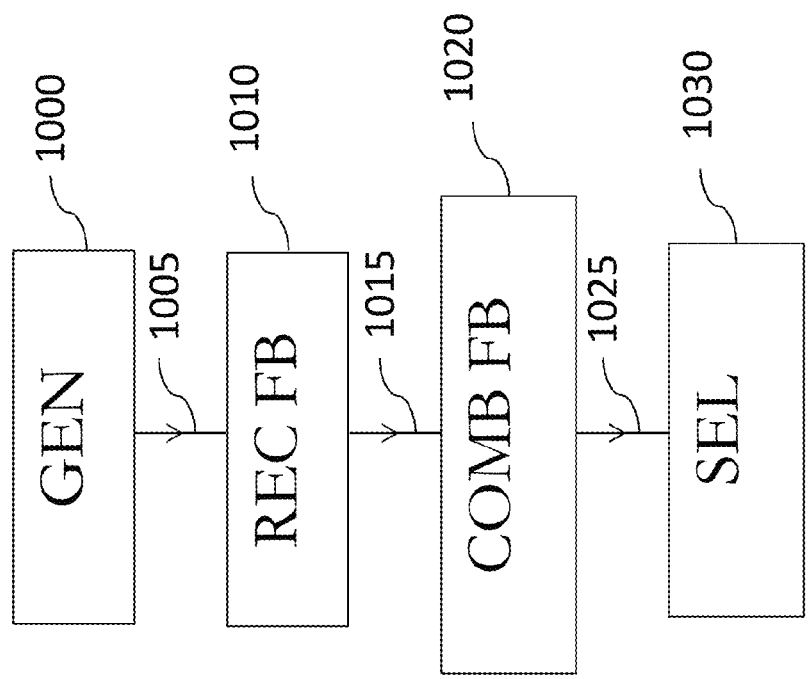
FIG. 10 is a flowchart of a method embodiment.
Figure 11:
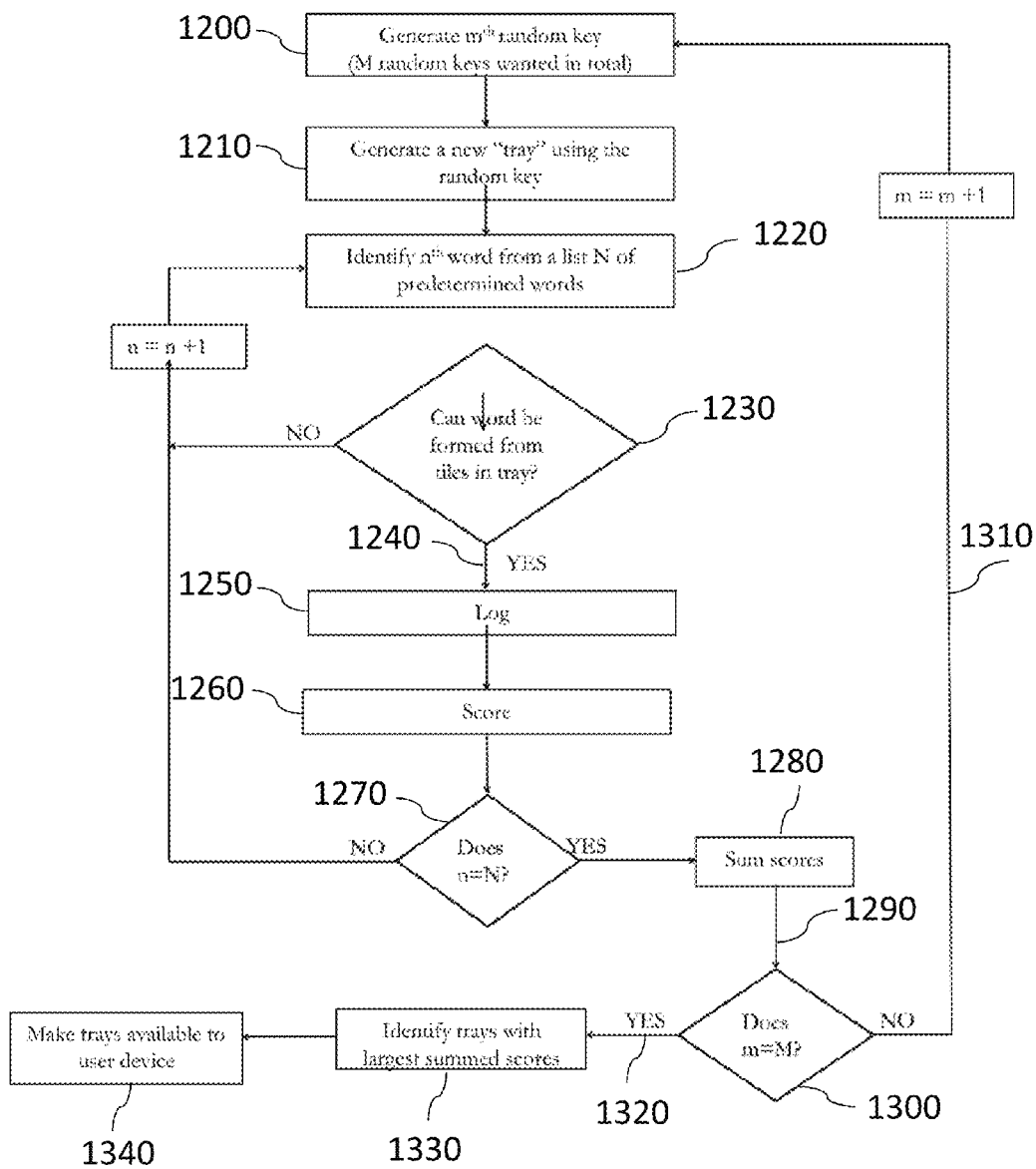
FIG. 11 is a flowchart of a method embodiment.

FIG. 10 shows a flow chart of an embodiment of a computer implemented method of generating display data 155 for a computer device 100*a*, 100*b*, 100*c*, 220. In this embodiment a set of letter tiles 310 for transmission to a computer device 100*a* is generated "GEN" at step 1000, wherein the tiles 320 are organised in a tray 310 displayed to a user, such that a user can select letter tiles to form words as previously described. Flow then proceeds via pathway 1005 to step 1010 "REC FB" where feedback information after a game has been played by a user is received at for example server 220, wherein the game constitutes selecting the tiles to form words. Subsequently via path 1015 the received feedback information is combined with feedback information from earlier games played by the same user or by different users.

Hence, for a gameboard 310, feedback may comprise positive or negative feedback from users, and/or their scores or perceived difficulty (for example not many words available).

The embodiment then proceeds via pathway 1025 to step 1020 wherein the combined feedback information is used to select a next set of letter tiles 320 to be transmitted to the computer device 100*a*, 100*b*, 100*c*, 220 to be displayed in the tray 310 for subsequent games.

Hence, in this embodiment gameboards 310 may be rated and ranked in order to keep users engaged.

Figure 12:
FIG. 12 depicts a screen of a game according to an embodiment.

FIG. 12 shows a further embodiment of a computer implemented method for selecting sets of tiles, wherein at step 1200 the generation of a set of tiles comprises generating a random key and subsequently using the random key to generate a new tray comprising the set of tiles at step 1210. Subsequently, at step 1230 the number of words that may be selected within the set of tiles are searched for against a list of words provided in a dictionary database for the language being played using for example a brute force technique. If a word match is found then the process flows via branch 1240 to step 1250 where the matched word is logged and then scored at step 1260.

Then, at step 1270, if all words in the dictionary have been searched (n=N) the process flows through the YES branch and the scores for each word identified within that tile set are summed.

If the number of instances of random keys has been exhausted (depending upon the number of sets of tile trays 310 one wishes to investigate and score) then flow proceeds from decision step 1300 via the branch 1320 to step 1330 where the trays 310 with the largest summed scores are identified (by for example ranking the trays in order of score) and subsequently these trays 310 may be stored and made available to a user device 100*a*, 100*b* at step 1340 for retrieval in either a future game or tournament.

Alternatively, if the number of instances of random keys has not been exhausted then the check at step 1300 will return the process via path 1310 to the initial step 1200 of generating a new random key and the process is repeated.

The engagement and user appreciation of such tile sets generated in this embodiment may also be monitored via the feedback mechanisms as described hereinbefore in relation to FIG. 12, thereby enabling a developer and user to influence the game to provide engagement, challenge and enjoyment with appropriate tile sets or game boards 310.

Those skilled in the art will appreciate that the game board or tile sets 310 are not limited to the five by five array boards described herein, and may comprise other suitable arrays such as seven by seven, eight by eight, ten by ten or more according to the game and user preference.

The present invention may be implemented with one or more of several different games or different types of games to be played in all or some of the rounds in a tournament. The different games may be random or for instance selected by the challenging player. In an alternative implementation the game to play for each round of the tournament may be selected before or as the tournament progresses.

The techniques described in this patent can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone etc.) to enable the client to render and display graphics and sounds; this 'web services' approach is increasingly common.

Another approach comprises a hybrid architecture, in which back-end servers 220 handle some elements of the gameplay, for instance a Java game applet is provided to client devices 100*a*, 100*b*, 100*c* and the locally running Java applet that generates the graphics/sounds/user interaction for gameplay on the player's client device 100*a*, 100*b*, 100*c*. Some data may be fed back to the back-end servers 220 to enable scoring, interaction with other players and cross-platform synchronisation.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as a keyboard.

Over the course of players playing the game, data will be produced and collected.

This data can for instance be related to a player's game performance or to game information related to a social network to which the game is connected. It is possible to gather this data, store it and make use of it for instance to improve the game. One example is by using a database to store the amount of times players try and fail a level on average. This data can then be reviewed, and if the players seem to fail a substantial amount of times before completing a level, the difficulty can be adjusted accordingly. The difficulty can be adjusted through changing a score target for the level, increasing the available time or moves or giving the player for instance a booster to enhance the gameplay.

There can be certain performance indicators used to measure the success of the game in addition to those previously described in other embodiments. These indicators can for instance relate to player retention, the virality of the game and the revenue of the game.

Other embodiments will now be described.

In another embodiment, the game may be implemented allowing a user to interact with it in different ways depending on the capabilities of the device which the user is accessing the game with. A user may interact with the game through using a touch screen where the user can select and/or move elements on the game board with a finger or for instance with a stylus. The game may also be played with a pointing device such as a mouse or other interaction devices such as a keyboard.

In an embodiment, over the course of players playing the game, data will be produced and collected. This data can for instance be related to a player's game performance or to game information related to a social network to which the game is connected. It is possible to gather this data, store it and make use of it for instance to improve the game. One example is by using a database to store the amount of times players try and fail a level on average. This data can then be reviewed, and if the players seem to fail a substantial amount of times before completing a level, the difficulty can be adjusted accordingly. The difficulty can be adjusted through changing a score target for the level, increasing the available time or moves or giving the player for instance a booster to enhance the gameplay.

There can be certain performance indicators used to measure the success of the game. These indicators can for instance relate to player retention, the virality of the game and the revenue of the game.

A person skilled in the art will realise that the different approaches to implementing the game is not exhaustive, what is described herein are certain preferred embodiments. It is possible to implement the way in a number of variations without departing from the spirit or scope of the invention.

Some embodiments can be played on platforms where the game is integrated with a social network and in some implementations the game may be a standalone game that is played by one player.

In an embodiment the game is a word puzzle game where the goal is to compose the three best scoring words on a game board of twenty five letter tiles placed as a square of five by five letter tiles. There is limited time to spell the words and as the words are submitted, the player will progress to the next round and get a new tile lay-up. In some implementations, the number of words required per level and the amount of tiles on the game board can vary.

There is in a typical implementation only five minutes in total to play through a total of five rounds. Therefore it is important not to waste too much time in each round. If the player spells a long word in each of the five rounds, it is possible to qualify for a bonus round and get a chance to increase the score further.

FIG. 12 shows an example game display.

When the game starts the game board is filled with letter tiles. Any letters that are touching each other may be combined into a word. Each letter can only be used once per word and also once per round, so choosing the right combination of words is the aim of the game.

The player should aim to find three words per round. Fewer words may be submitted if the player cannot find sufficient words, and it is possible to change the words up until the words are finally submitted for each round.

A word has to be a certain amount of tiles long to be submitted, for instance three to ten, although this may vary in some implementations. The letter tiles typically have different values depending on how common they are in the dictionary. Also, longer words are worth relatively more points than shorter words.

In a typical implementation, the player can create words that are in any form, singular or plural, present or past tense etc. This makes it strategically important to look for the possibilities of creating a longer word with touching letter tiles by using a different form. Combinations of several extensive dictionaries may be used to determine whether or not a word is accepted. No abbreviations or names are accepted. If a word is input that is not found in a dictionary, it will not give any points to the player but neither will it cause the player to lose points.

Score estimates for the words can be seen as they are spelled out, but the player will not know whether they are accepted by the dictionaries until all words in a round have been submitted.

Figure 13:
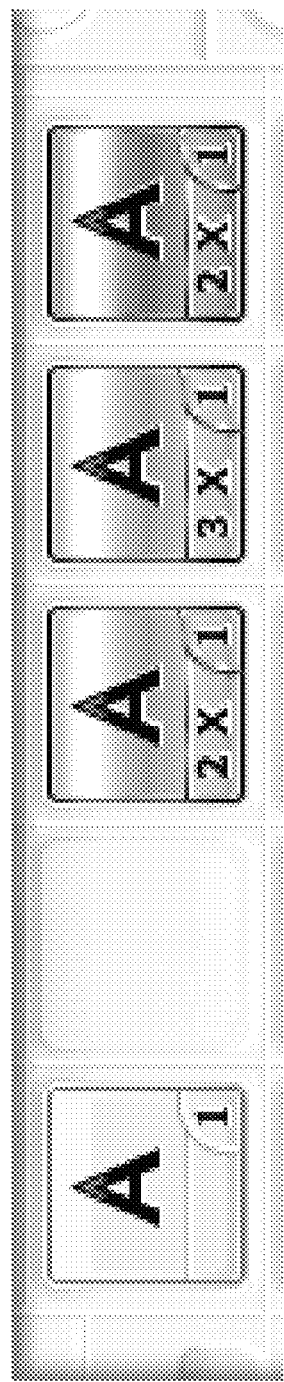
FIG. 13 shows bonus tiles according to an embodiment.

In one embodiment there are three types of bonus tiles which are all shown in FIG. 13:

2× Letter: This doubles the Letter score of the tile.
3× Letter: This triples the Letter score of the tile.
2× Word: This doubles the value of the whole word in the same manner, including any letter that has already been doubled by a Silver Bonus Tile.

Bonus tiles (see FIG. 13 for an example) can be earned by submitting long words that are approved by the dictionaries. In order to receive a 2× Word bonus tile the player needs to submit words that are at least six tiles long.

On the left side of the game board the current round is displayed. As each round is completed, the player will see whether he or she qualified for the Bonus round. This is typically indicated by the portion corresponding to that round being shown in a positive colour such as green.

In order to play the Bonus round this the player will have had to submit at least one approved word of five tiles or more, or three words with four tiles in each of the five rounds. If these criteria are not fulfilled in each of the five rounds, the player will not get to play the Bonus round.

In the sixth bonus round the number of Silver and Golden bonus tiles will be higher than in the regular rounds, so reaching it will allow the player to achieve a better score.

When time runs out the game is over, and the final score will be shown to the player on the result page. It is also possible to end the game prematurely by using the End Game button.

In some implementations, there is a bonus tile called a 'hot tile'. This tile will triple the value of the whole word it is used in, but if it is not used, the player will receive half the value of the lowest valued word in the round.

In an embodiment for every round the player may input up to three words. The letter tiles the player wishes to link into a word are connected by clicking on them, for instance with the left mouse button if the game is being played on a computer. It can also be possible for the player to click on the first letter of an intended word and then hold the mouse button and drag the pointer over the subsequent letters of the intended word.

The letter tiles have to be touching each other to be able to be combined. When a word has been completed, the player can lock the word and move on to forming the next one. In a typical implementation, this is performed by clicking an additional time on the last letter tile. Alternatively the player may click on the next word field to the right to activate the next word. A word that has not yet been locked is pink in colour, which changes to blue when the player locks the word.

A tile may only be used once in a round, so when a tile is already used in one word it cannot be used again in another one. For instance, with reference to FIG. 14, the letters used for the words 'mine' and 'lies' cannot be used when forming the third word starting with 'na'.

Figure 14:
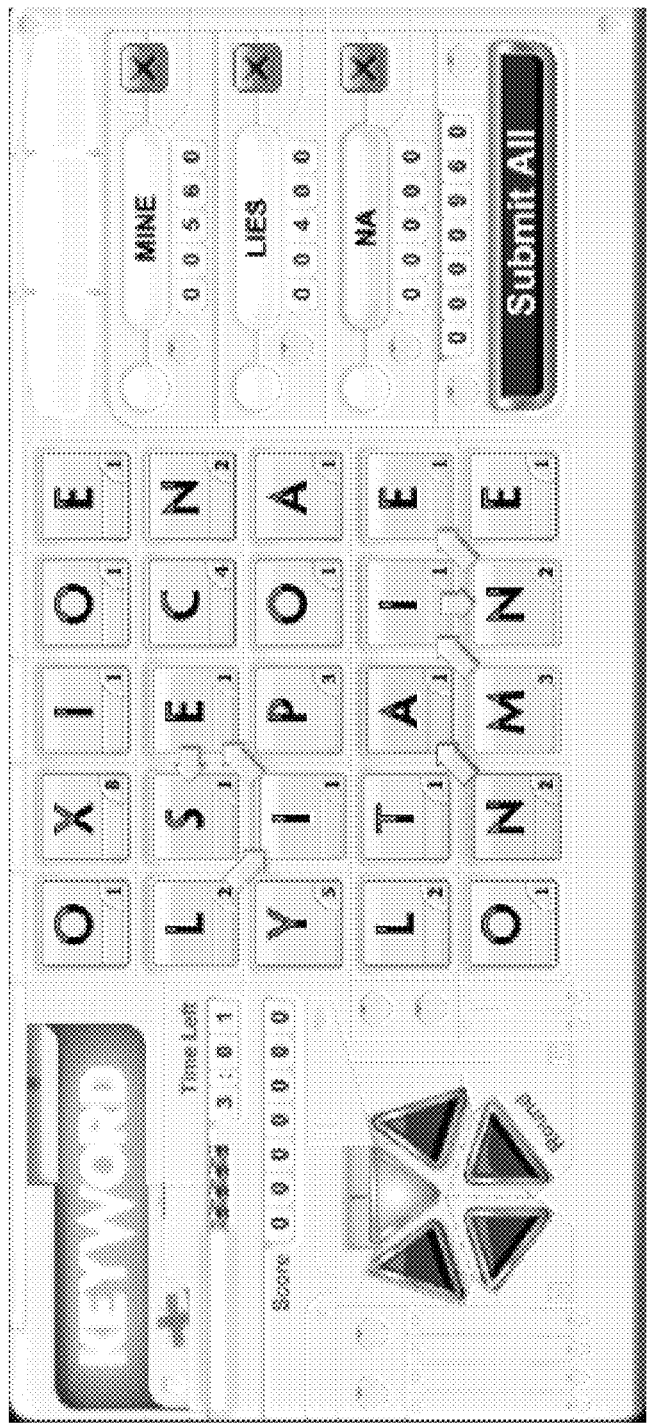
FIG. 14 depicts a screen of a game according to an embodiment.

To quickly re-spell a word that has already been locked, the player can click on any letter tile in that word to reactivate it—the letter tiles will again become pink. It is also possible to use the x-buttons next to each of the three word fields to quickly delete a word completely. These x-buttons are shown in FIG. 14.

If the player wishes to unmark a tile, this is done by going back and clicking on any tile used earlier in the word to back up to that specific point. It is possible to unmark a whole chain of letters at once by clicking on another part of the game field.

To submit words and go to the next round, the player can click on the Submit All button on the right side below the words, as shown in FIG. 12. After this it will be shown if the words were approved by the dictionaries and the final scores for the round are received. The player does not have to find three words to move on to the next round, rather it is possible at any time to move to the next round if no more words can be found. If the player wants to end the game prematurely, the 'End Game' button can be used, which is typically located in the bottom right corner as shown in FIG. 12.

In some embodiments the word scores may be based on several factors, mainly the value of the letter tiles that are linked and how many tiles used to form the word. This means that long words with more difficult letters are more valuable.

In a typical implementation, the word score may be calculated as follows:

Word score=(Sum of letter tile values including Letter bonuses)*(No. of tiles used squared)
\*5\*Word Bonus In an embodiment using the English language and associated dictionaries, the scores for each letter may be as follows:

1 point: A, E, I, O, R, S, T,
2 points: D, G, L, N, U 3 points: B, M, P
4 points: C, F, H
5 points: K, V, W, Y
7 points: QU (counted as one letter tile)
8 points: J, X
10 points: Z The player does not receive any point deduction for a word that is not approved by the word list.

It is possible to receive bonus score based on time if a round is completed faster than in 60 seconds. The Time bonus may be typically calculated as (120−Seconds used)*2, and if more than 60 seconds is used then no Time bonus is then received for that round.

At the end of a game, the player is shown detailed statistics about the words used and the scores received. These statistics may for instance include bonus tiles used, time bonus received and the total amount of submitted words. An example of an implementation of the detailed statistics is shown in FIG. 15.

In an embodiment, spelling longer words significantly raises the score as well as brings the Golden bonus tiles into play. So when spelling a word, the player should check nearby letter tiles to see if you can make it longer by using a different form.

However, speed is also important in order to have time left on the bonus round in case it is reached, so it is also important for each player to not think for too long or dither.

In some embodiments, getting to the Bonus round may be valuable, so the player should make sure to qualify in each of the rounds.

A long word is worth much more than several short words, which is important to keep in mind when prioritizing.

Games created using the invention described herein can be connected to or linked with a social network such as Facebook™ or Google+™ or a games platform with different players who can interact and see each other's progress. It is common that the users on such networks have avatars with for instance a photo of the user and/or the user's name. Such avatars can for instance also be a sign or a figure.

The social network 230 can be located on a server that is different from the server 220 on which the game may be located, the game and the social network may also be located on the same server.

In some implementations there is a direct live connection between the social network and the game platform that continuously synchronise them, in other implementations the two platforms synchronise at certain intervals, such as when the player logs into the game. The players progress when having played in offline mode (for instance completed levels and score), for instance if the player is travelling in a tunnel, can be synchronized when the player is connected to the internet.

The user and his friends' avatars can be displayed in the game or in relation to different levels in the game to show the player's progress. The avatars can also be shown in relation to indicators of the player's skill level or high score. In some implementations the avatars can be derived from a social network to which the game is connected, in other implementations they can be derived from a database related to the game. It is possible for the avatars related to users to change depending on the overall progress or performance in the game. For instance, an avatar can become larger or more visually advanced as the player plays the game for a longer time.

The user can connect with other users of the social network, either as "friends" on the social network or as "friends" within the game environment. The player can interact with other players he is connected to on the social network or who are playing the same game.

The game can be implemented to synchronize game state information and/or retrieve and connect to the social graph information and user profile of the player on a social network. It can also be connected to a proprietary network related to the game or the game developer.

The game can also be implemented so that it is connected to a plurality of social networks. The user can be given the option to select what information that can be derived and shared with which social network.

One example of how the game can be connected to a social network is the Facebook™ Open Graph API allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post events, such as that a player has purchased objects in the game or received objects from other players of the game.

In an embodiment, a game using the techniques described herein is played through a web site providing a plurality of casual games. This platform can be used as a basis to test the performance of the game and how it is perceived by players. In some web-based implementations the game is implemented to be played in head-to-head tournaments, has a limited number of levels and no external social network connection. In some implementations the players can play the game against other players on the platform.

If a game proves to be successful in a web-based implementation, it can be further adapted to another type of implementation, based on a virtual terrain in which the player progresses. This implementation typically has a connection to an external social network, and can have multiple game modes such as asynchronous and synchronous tournaments and single player mode. The nodes on the map in the game are typically different levels that the player can play.

The two implementations described above can be part of a modularised approach to developing games, which help streamline and facilitate the process of producing as well as further developing new titles.

The game can be implemented, in an embodiment, so that a player progresses through multiple levels of changing and typically increasing difficulty.

Figure 16:
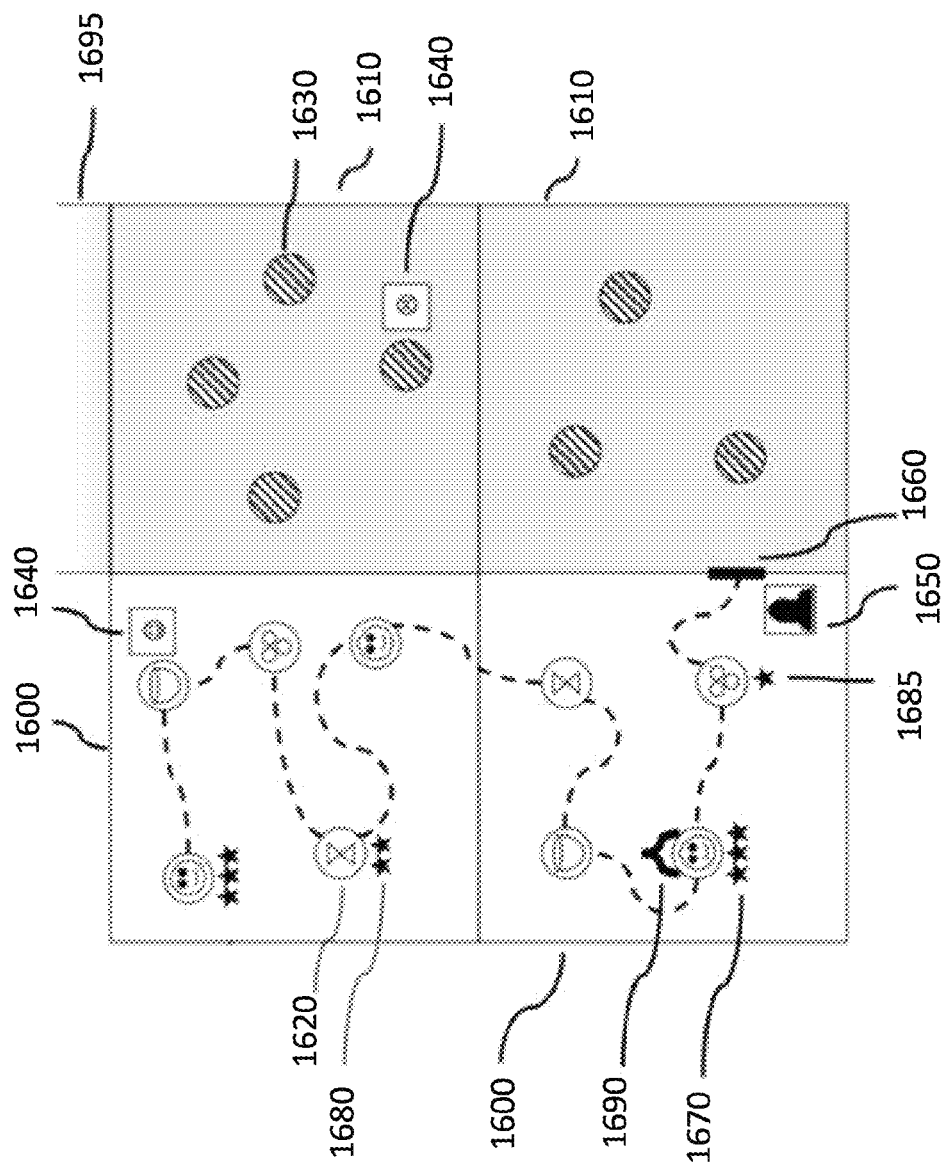
FIG. 16 illustrates a virtual map of an embodiment.

FIG. 16 shows an embodiment of the game with a virtual map layout of a game environment, displayed on the screen of the computing device used by the game player. As the player progresses through the levels in the game, his progress is represented as a journey along a path on the virtual map. Representing progress in this manner provides an additional layer of engagement for players, and also opportunities for viralisation and monetisation.

The virtual map consists of stages 1600, 1610 with varying number of levels 1620, 1630, represented by nodes on the virtual map. The user travels between levels and completes the levels one by one along a path by playing the associated game. When the player reaches the goal of a level, the next level on the path is unlocked and the player can play that level in the game. The number of stages and levels can vary depending on the implementation.

In some implementations of the game, the player will be introduced to the game by tutorials explaining the fundamentals of the game. One way of doing tutorials is to force the player to make certain moves, for instance in the first level of a game the player might be prompted to make the most basic move possible without the option of doing any other move. The tutorials will in most cases be concentrated to the first levels of the game, but they can also be used at later stages to explain newly introduced elements and objects.

The levels can be numbered consecutively throughout the game or they can be numbered within a stage, it is also understood that other ways of identifying the stages and levels can be implemented. New stages to the virtual map 1695 can be added by the game designers at any time—so a game may be launched with perhaps twenty levels, and after a number of weeks, there may be fifty or sixty levels present.

Stages in the game can be both locked and unlocked.

In some embodiments, the majority of levels start out as locked and are then unlocked as the player progresses in the game. Unlocked stages can typically be replayed at any time. One way of unlocking new stages is to complete the last level on the latest stage. The user is sometimes faced with other challenges to unlock the next stage in the virtual map.

In some embodiments, certain levels and stages may be locked based on other criteria than the player's linear progression in the game. Such levels can for instance be based on the total score the player has achieved on all levels, the average performance on levels or on the number of friends that the player has invited to play the game.

In one implementation, one challenge 1660 to unlock a stage arises when traveling from one stage to another once all the levels have been completed in that stage. The levels in the stage to which the player is travelling is typically locked by default, and the player must unlock them. This requires the help of for instance three friends. The player can ask friends for help by sending an in-game message within the game environment or for instance through a social network that the game is connected to. The friends can already be playing the game and do not have to be 'new' players, but they can be friends not already on the same social network.

The player may also pay to get instant access to the locked stage. The currency used for paying can vary between different implementations, for instance it can be hard or soft currency, or it can be based on score achieved in the game. It is possible for the currency to be associated with a social network to which the game is connected, or it can be associated with another platform related to the game. The player can use a combination of help from friend and payment to unlock the new stage. The cost for unlocking can in some implementations be lowered as a fraction of the total number of friends needed when help from some but not all needed friends have been received.

The request for help is sent to the friend who then has the option to accept to help.

The request for help can in some implementations be sent using the social network to which the game is connected; an alternative implementation is to send the request to someone external to the game (via email, text message, instant message for instance) who has to join the game to respond to the help request. It can be understood that there can be variations between implementations in regards to how players respond to requests from other players. In a typical implementation, a link will be provided to the player who has been requested to help. This link can be related to a social network to the game is connected. This is one of the viralisation techniques implemented in these embodiments of the game.

In addition to the virtual map layout in FIG. 16, there can also be other levels or stages that are not part of the progress along the path in the virtual map. Such stages or levels can be present in the game associated with the virtual map at all times or can be unlocked when the user reaches a certain in-game achievement. This in-game achievement can for instance be completing a specific level, reaching a predetermined high score (for instance, collecting a specific number of stars when completing a level—highly skilled gameplay can win the user three stars) or paying virtual currency to unlock the stage or level.

The map layout in FIG. 16 can be used in games connected to or linked with a social network or in a game with a user database. It is possible for users to have an account in the game or on the social network. It is common that the users on such networks have avatars with for instance a photo of the user and/or the user's name. Such avatars can also be a sign or a figure. The user's avatar is displayed on the map layout alongside the level where the user is 1650. It is understood that there are different implementations of showing where the user currently is on the map. This can for instance be the latest level the user completed, the level where the player has achieved the highest score or the last completed level along the traversed path.

The user can in some embodiments be given the option to select which users should be shown on the virtual map. The users to choose from can be friends on a social network, or the user can get suggestions to show friends who meet a certain criteria, for instance friends which the player has interacted with the most in the past or friends living in the same geographic area as the player. The user can get the option to choose from other people not being friends on the social network, but that meet other certain criteria.

The user can play any of the unlocked levels on the map, so the user can go back and replay already completed levels to get a better score or beat friends' high scores.

The player is in some implementations of the game rewarded for good gameplay of a level, for instance reaching a target score or completing the level in a short time. In some implementations the user has to reach a certain number of points to complete a level, reaching this target score can be represented with a symbol such as a star. In one implementation a star is lit when the user reaches a certain number of points in a level. The user can earn more than one star on each level and the levels are re-playable to get a higher score. In some implementations the indicators representing the players' performance can be related to other goals, such as completing levels within a certain amount of tries.

The player's total number of stars collected in the game can in some embodiments unlock features. The unlocked features can for instance be power-ups, in-game currency or bonus levels. After being unlocked, such features can typically be accessed by the player in the game. Some unlockables might be given to the player while others require a purchase to be accessed.

The symbol representing how well the user has played on each level can be displayed alongside the level on the map 1670, 1680, 1685 in FIG. 16.

In the map view, the player can hover over an unlocked level to display a thumbnail version of it. This makes it easier to find specific already completed levels, and can also give the player an idea of what to expect before actually starting a level. In a typical implementation, thumbnails cannot be displayed for levels that have not yet been unlocked. If trying to view one of these a symbol of a padlock will be in the place the miniature version of the level is supposed to be.

The thumbnail can also display how well the player has done on the level if he has played it previously. This can for instance be represented with the number of stars the player has received on that level, the actual score or some other indication.

The thumbnail can also display the player's position on the high score table in relation to the player's friends or showing what friends are on the high score table. This can be a driver for the player to replay the level to beat one of the friends.

If the game is connected to a social network or the user has connected with other players in the game, the levels can present a leaderboard showing who among the user's connections, or among a subset of the user's connections, that has the highest score. There can in some embodiments be a notification 1690 shown on the map if the user that has the highest score among the friends connected to the game. Such a notification can be in the form of a message sent through for instance through the social network or an in-game message.

The type of game mode or game goals for a level can be displayed on the map as a symbol, for instance it can be a symbol for the level itself, or it can be shown in proximity to another symbol for the level. Such a symbol 1620 can for instance be in the form of an object related to the game goal, such as an hourglass representing a level with a time constraint.

Before starting a level, players have to select which level to play from the map view which may indicate levels or stages where boosters will be awarded 1640. When selecting a level, the player is shown information about the level, such as the amount of points needed, the available boosters that can be used, the goal of the level and also the highscores of friends who have previously played that level.

Figure 17:
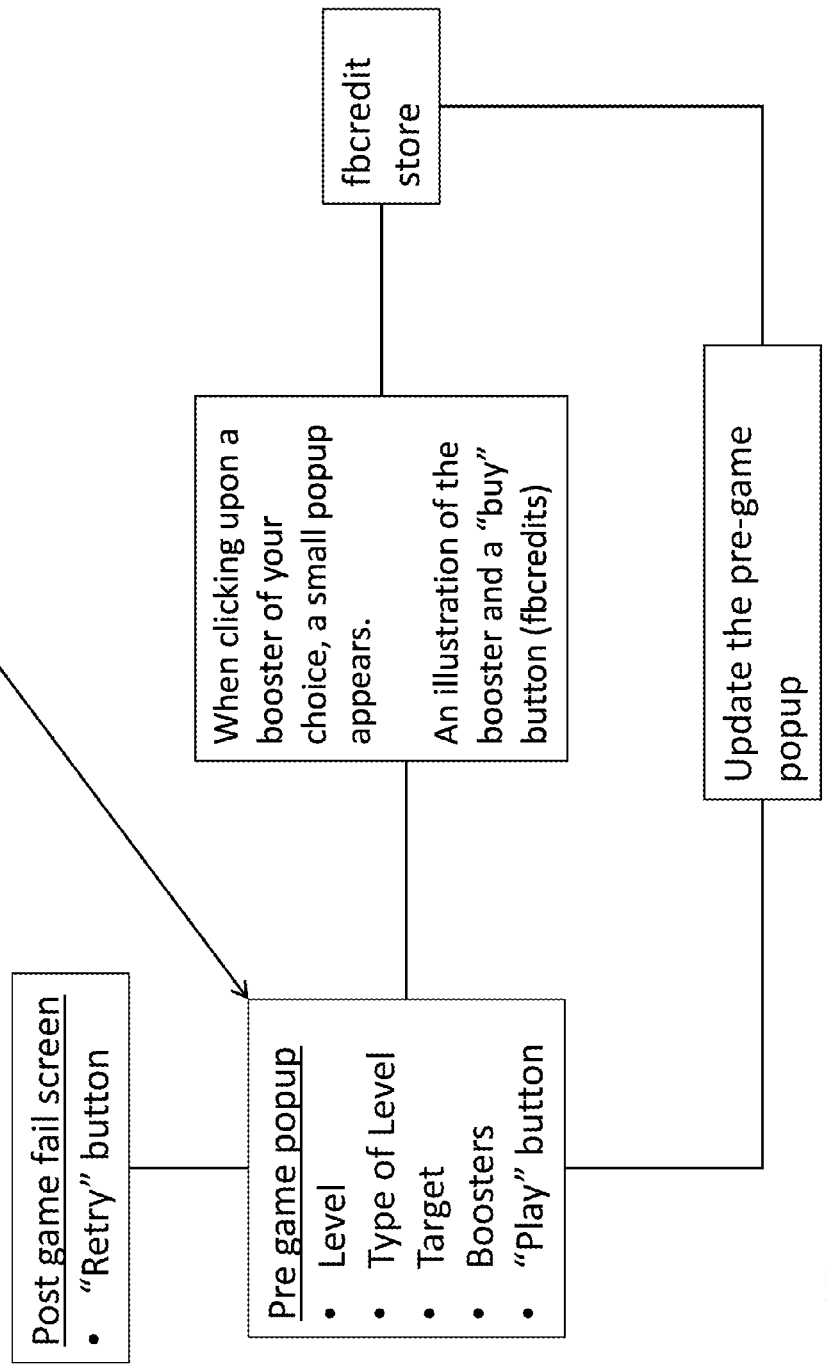
FIG. 17 shows a game flow of an embodiment.

FIG. 17 shows one implementation of the game flow before starting a level, including which screens are shown to the player. When choosing to play a level, either after having previously failed it or after having selected it from the map mode, the player is shown a pre-level screen. Through this screen the player can choose to purchase boosters. By doing so, the player can be transferred to another screen representing the in-game shop, or the purchase can be performed while still in the pre-level screen. If the player has no currency available, it is also possible for a screen related to acquiring currency to be shown.

Figure 18:
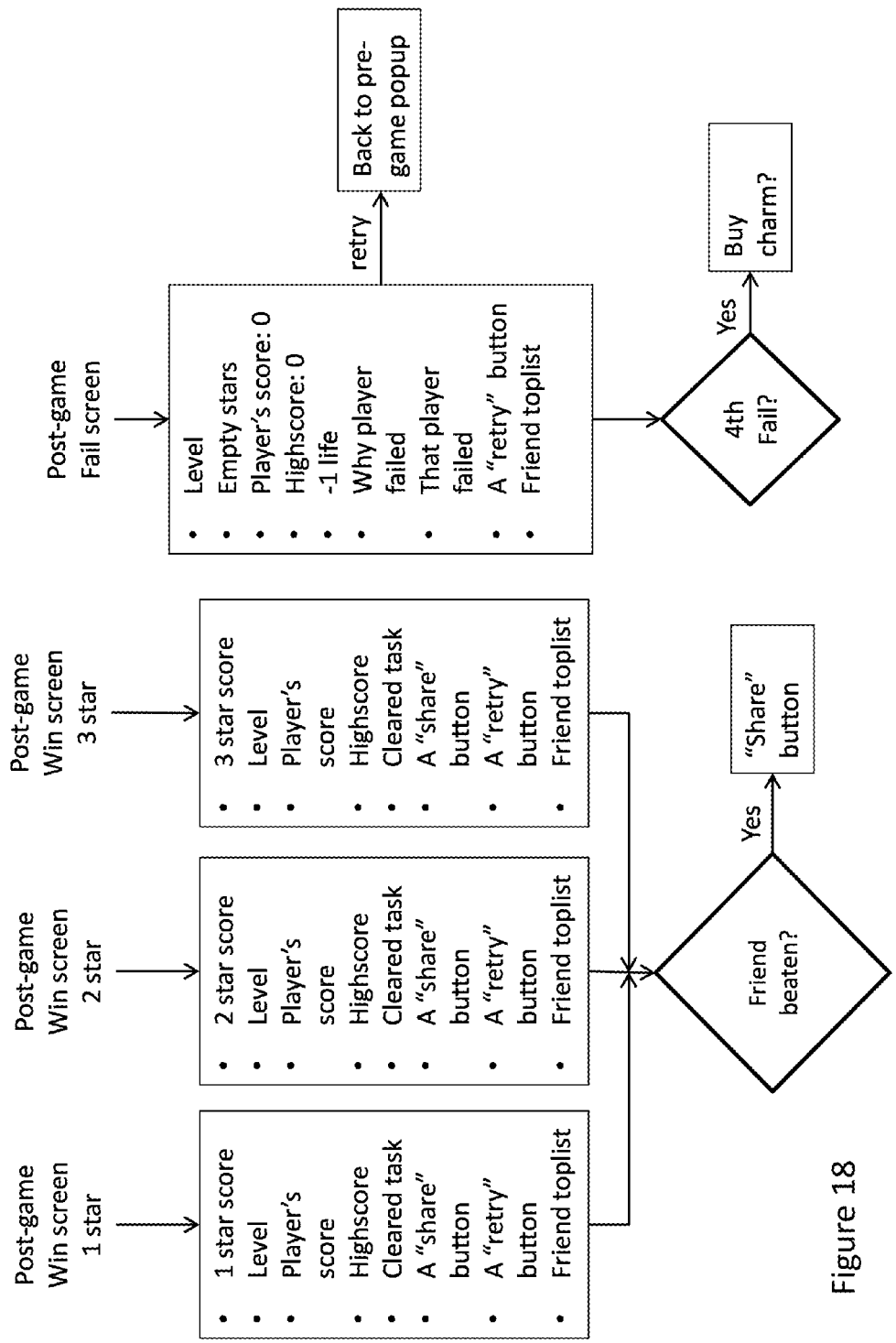
FIG. 18 shows a game flow of a post level screen of an embodiment.

After completing a level, the player is presented with a screen that shows the amount of points gained, the amount of stars achieved and also the previous highscores of friends. One implementation of the game flow related to the post-level screen is shown in FIG. 18.

Both of the post-level screens discussed present the player with an option to share this information. The sharing part is done on a social network to which the game is connected. By sharing information such as which friends the player has beaten, competition is encouraged and the viralisation of the game is increased, due to people not playing the game also being able to see such messages.

The player can also be presented with another screen related to the performance on the freshly completed level. This screen shows how good the player scored in relation to friends' highscores, together with a message about which friend(s) that have been beaten.

When showing the pre-level screen, players are presented with the highscores of friends. This gives an opportunity to know beforehand what to aim for, and is something that increases the competitive element in the game. The information about friends' scores can be derived from a social network to which the game is connected, it can also be retrieved from a database related to the game. It is important for further increasing the engagement and of players and to some extent viralisation, since players are constantly being reminded about the performance of others, which can incentivise players to try harder and subsequently play more.

In some embodiments, each area in the game or certain groups of friends or players can have a 'Champion', 'King' or similar, meaning the player within a network of players that has the best performance on the levels in that area.

In some embodiments, there are indications of the performance of other players displayed during the play of a level. This information is often based on data from previously completed levels, but it can also be related to levels that have been attempted and failed by other players. Performance information can for instance be derived from a social network connected to the game or from databases more directly related to the game. In some implementations, players can see the score of other players in real-time, thus increasing the competitive element of the game. The other players whose performance will be displayed is sometimes chosen by the player, sometimes automatically derived from a social network of the player, and other times it can be based on other elements, such as the performance of all players of the game.

Figure 19:
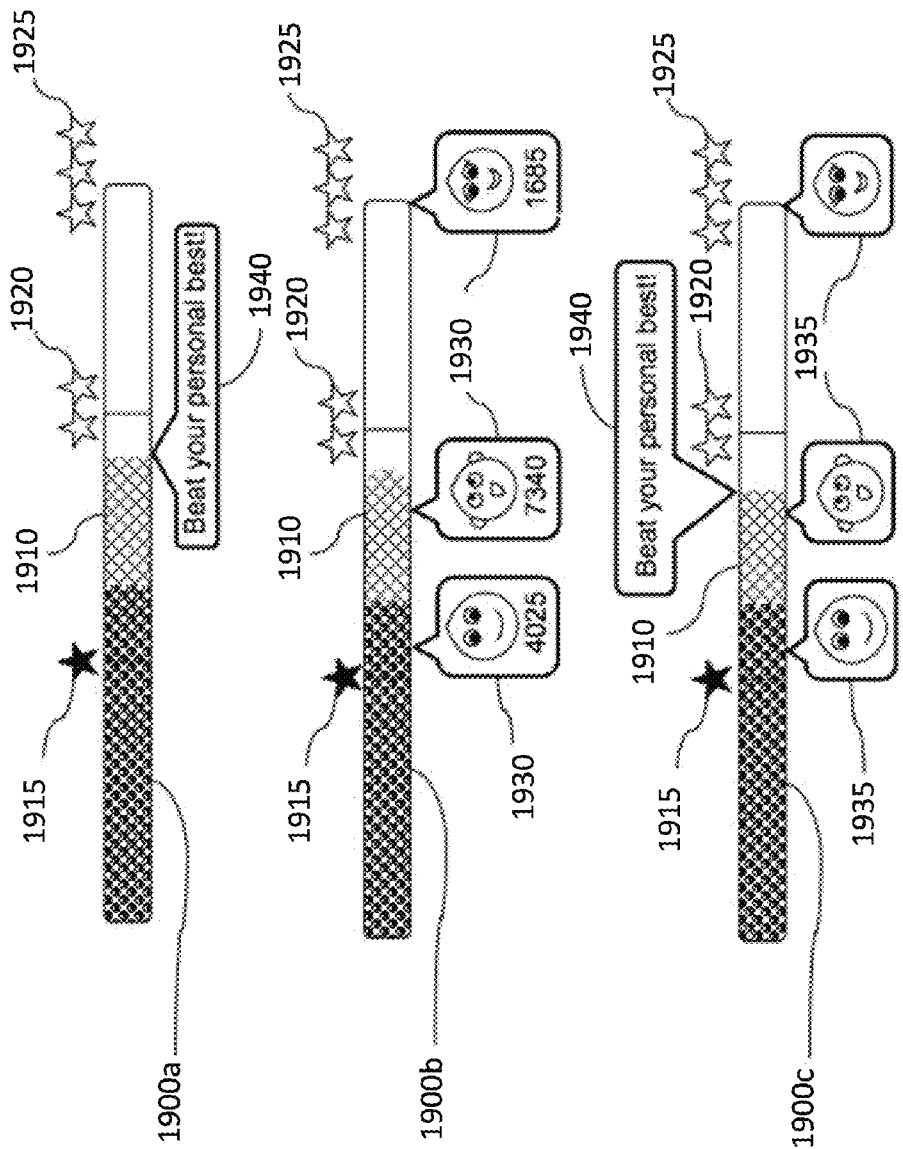
FIG. 19 illustrates example score meters according to an embodiment.

In an embodiment, and with reference to FIG. 19, the player can see indications 1910 of the previous high score achieved on a level while playing it, on a score meter 1900*a*, 1900*c* if such data exists. The score meter 1900*a*, 1900*b*, 1900*c* may also illustrate a standard of achievement for that level as indicated by stars 1915, 1920, 1925. It is also possible that no indication of the player's own previous score is shown.

In some implementations, the indications of the performance of other players 1930, 1935 are shown in relation to the score meter 1900*b*, 1900*c*. It can be both absolute indications 1930 and relative indications 1935. The indications 1930, 1935 can be in the form of pictures associated with the players. When the player passes the score of another player or the previous best score the player has achieved, a message can be shown to encourage the player and denote the accomplishment. One example of such a message is illustrated by 1940.

It should be understood that the invention is not limited to using stored scores to show the performance of other players. In one implementation, players can see the scores of other players currently playing the same level while they are playing it, making it so that the indications of other players' scores can be moving in real time during the play of a game.

The score comparisons presented to the player may be given in percentages, points and when applicable other indicators, for instance time played or number of attempts on a level.

Another feature in the game that increases the competitive element is that friends' progress on the virtual map is shown. Even if the player has not unlocked or reached the areas in which friends are playing, their progress can still be shown by means of a picture associated with the player being displayed next to the level they are currently at.

It is also possible to invite new players to play the game. These can be invited through the game platform or through a social network to which the game is connected. In some implementations, the game suggests which players to invite. This suggestion can for instance be based on if the players have played other games from the same developer, if they are active on a social network or if they seem to like other games in the same genre. It is also possible for the suggestions to be based from data related to a social network, such as how often they interact with other players or how often they log in to the social network.

One aspect that increases the competitive element of the game is that messages can be sent to friends, for instance related to beating their scores or passing them in terms of overall level progression. In some implementations, the game prompts the player to send a message to signal that a friend has been beaten. This message can be edited by the player, or it can be a pre-defined version suggested by the game.

The messages can be generated on a server hosting the game or on a server hosting a social network to which the game is connected. Information used in the message can for instance be derived from one of the databases to which the game is connected or from databases related to networks to which the game is connected.

In some embodiments, a player of the game has a certain amount of lives that are used as the player attempts to complete levels. If the player starts a level but does not complete it, a life is lost. When having no lives left, the player cannot play the game anymore.

Regeneration of lives can be done automatically or manually. In some implementations, the player will regenerate lives over time, for instance by replenishing one life every thirty minutes. In other implementations, the player can only regenerate lives by performing certain actions, such as playing other games from the same developer or by making a purchase related to the game.

One feature, in some embodiments, of the game that increases the viralisation and engagement of players is the ability to send gifts to other players, which help them in the game. It is possible to give certain gifts for free, such as extra lives.

The option to send free lives is available for instance through the pre-level screen and the post-level screen. Which players and/or friends that are displayed as suggested recipients of gifts can be dependent on variables such as how many times they have been attempting a level without succeeding or how long they have played the game in total. It can also be related to data from a social network to which the game is connected, such as how many interactions the player has had with different other players.

Figure 20:
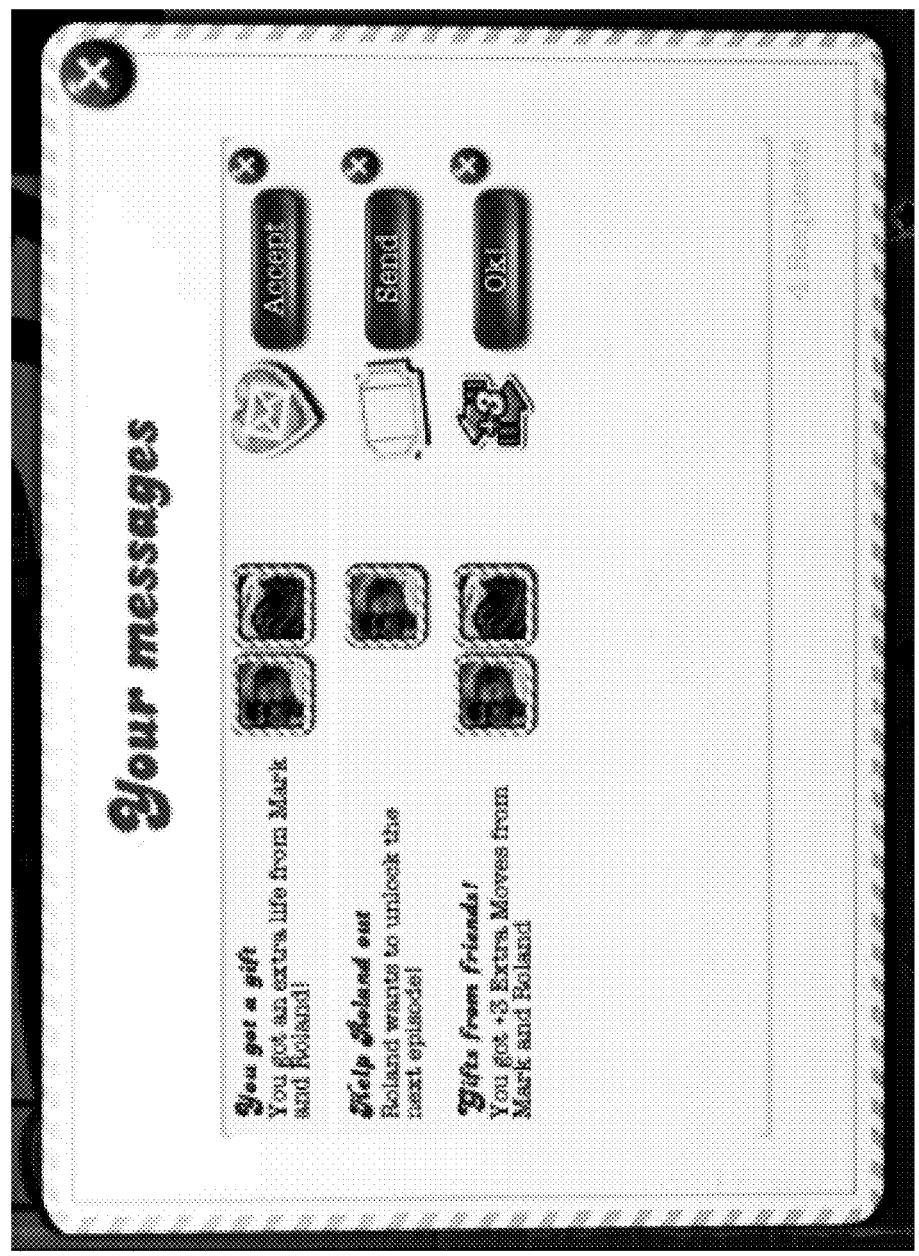
FIG. 20 shows a game screen according to an embodiment.

When starting the game, the player can be presented with a list of friends to send lives to. Another screen that can be presented when starting the game is one showing new messages. Gifts sent from other players can be displayed under messages, and certain free gifts such as lives can easily be reciprocated for free. Other gifts that cost money to send cannot always be freely reciprocated. In some implementations, the player can send a life back by just clicking a single button. The life can for instance be sent via the game platform or via a social network to which the game is connected. FIG. 20 shows one example of an implementation in which the player is prompted by the game to send lives to friends.

In some implementations the game prompts players to send lives to other players that have run out of lives. When a player completes a level after receiving help from a friend, a 'thank you'-message can be sent to that friend, either automatically or manually. This message can contain an item of value. In some implementations the player helping another player can get other benefits, such as special symbols or marks being displayed next to their names. Recognition is another benefit that can be awarded to players who help others.

In some implementations, lives that are received in the form of gifts have slightly different characteristics than lives that are gained by other means, such as time-based replenishment. For instance, lives in the form of gifts can make it possible for a player to have more than the otherwise maximum amount of lives. As an example, if the maximum amount of lives is five and the player gets sent an extra life, the player can have access to six lives. However, once the lives are reduced below the standard maximum threshold they will not automatically replenish above that, unless another gift is received.

Figure 21:
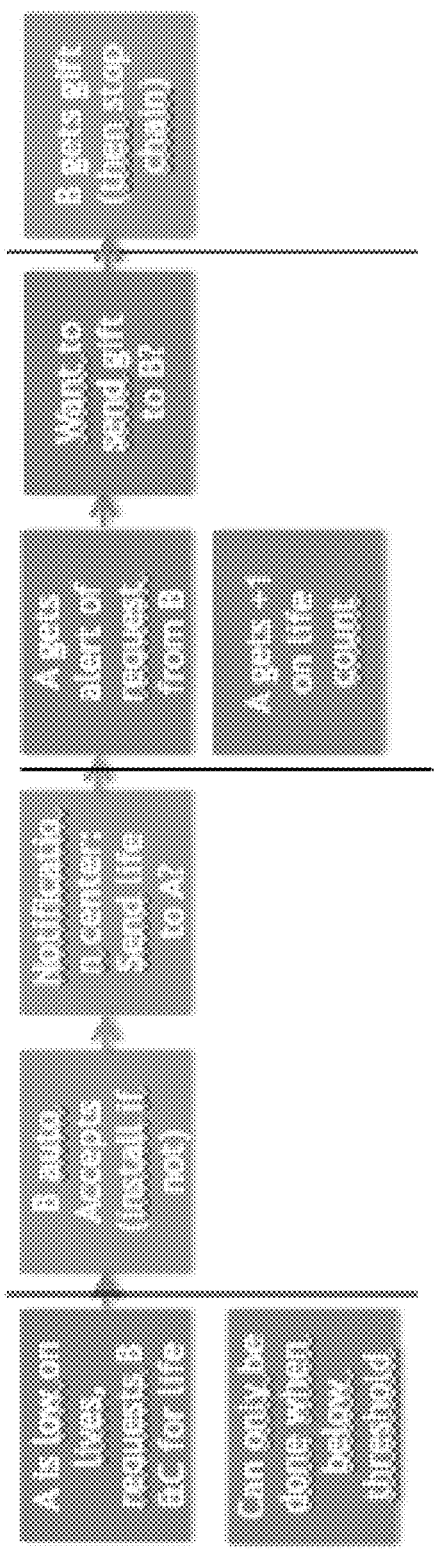
FIG. 21 shows a game flow of an embodiment.

In an embodiment of a mobile version of the game, the player is presented with messages when logging in. Messages that are presented can be related to the player receiving lives and friends requesting lives. This is shown in the figure below. After receiving a life from a friend, the player is asked to send a life back. If choosing to send a life back in response, the friend who originally sent it will not get a request to send back yet another life. So, this chain of events has two steps if a player starts out by sending a life without request; step 1 is sending a life and step 2 is the recipient sending a life back in response or thanking the sending player in other ways, such as a thank-you message or by sending in-game currency. If a player starts with requesting a life, the chain of events has three steps; step 1 is requesting a life, step 2 is receiving a life, step 3 is sending a life or a thank-you message back in response. One implementation of this chain of events is illustrated in FIG. 21.

It may also be possible to buy gifts in the in-game shop and send these to friends. Such gifts are in the form of boosters that can be used either during a level or before a level.

In other embodiments to help friends, the game is provided with the feature to send items that provide in-game benefits, such as extra moves or extra time depending on the level requirements in the game. In some implementations, certain criteria must be fulfilled in order to send such help. The criteria can be related to how long a player has been stuck on the same level.

A list of friends playing the game can be presented, with suggestions of which ones to help. Some of these friends might have been stuck on a level for an extended period of time, and the player then has an option to help these players by sending extra moves or extra time, free of charge. This can be different from boosters that give extra moves or time, for instance by only being usable and available on a specific level. This can be a way of facilitating the harder levels of the game by receiving help from friends, increasing player engagement and viralisation.

It is also possible for the game to prompt the player to send help to friends that have been stuck on the same level for an extended period of time. In some implementations, this period of time is two days. In other implementations, the criteria for a player being stuck is related to the amount of times they have tried and failed a level.

The prompting from the game can happen at different points in the game, for instance when a player logs onto the game. Such prompting is illustrated in FIG. 22. The prompting increases engagement by increasing the likelihood of someone providing help to players when the game is particularly difficult, and also adds a sense of collaboration and community among players. When a player has received extra moves, it can be indicated by a symbol next to the level in which the moves can be used.

In some implementations, the player may receive help from multiple friends. Help from multiple friends can be used at the same time or distributed over multiple occasions. When a player completes a level after receiving help from a friend, a 'thank you'-message can be sent to that friend. This message can have different implementations, such as the ones described in the passage above about a thank-you message related to sending lives.

In an embodiment, the game can also be implemented to be played in a tournament mode with a limited time or limited number of moves or both over a consecutive set of levels. The score can be collected over the several levels to give the player a score for all the levels completed. The tournament mode can in some implementations be played with a virtual map, in other implementations the game has a special interface for head to head competition. One such implementation can be a split-screen mode where each player can see what the other player does in real-time.

The player can in some implementations play the game in head to head tournaments against one or several other players. The player with the highest collective score over the number of levels will be the winner in the tournament. In some implementations the tournaments are played with real time comparisons of players' scores, in other implementations the scores of players are compared after finishing a level.

The game can also be played in tournaments with jackpots where the player plays the same level where the same types of game elements are used. Jackpots can be absolute or they can be given as a multiplier of a stake that the player can input.

The game can also be played in an elimination competition against other players.

In an embodiment, the game may have schemes for giving rewards and bonuses to players. One reason for giving out rewards is to increase player engagement, and to some extent to help with monetisation. Players can for instance be rewarded for playing. Criteria can include playing for multiple days in a row, playing a certain amount of games within a certain time frame, playing a certain amount of games per day, achieving a certain score per day, etc. This is something that awards persistence and dedication. In other implementations, there is a daily bonus available that is gained by every player playing the game online during that day, or to players passing a certain secret location during that day.

By giving players samples of existing boosters, they are given a free preview of purchasable items that potentially can lead to sales in the long run, which helps monetise the game. Some implementations contain boosters that regenerate over time, for example a booster that can be used once every two days.

It is possible for players to make purchases in the game or through a social network connected to the game. One way of making such purchases is through the in-game shop. The shop is accessible for instance through the virtual map screen, but depending on the implementation it can be available from any screen in the game. From the shop it is possible to buy permanent as well as non-permanent boosters. These boosters can be used to gain benefits in the game, or they can be sent to friends as gifts.

The player does not always have to enter the shop in order to purchase boosters. The pre-level screen is one example of where the player is presented with the option to buy boosters without first entering the shop. A person skilled in the art will understand that this is just one example, it is possible to have purchasing options available from any screen in the game. The purchases can be made through a game platform or through a social network to which the game is connected.

In an embodiment, the game platform communicates with the social network platform to indicate that a player is interested in buying an item in the game. The player is then directed to a purchasing window associated with the social network to which the game is connected. This window can be within the social network interface or it can be related to a third party service that provides payment options. In the purchasing window the player can choose to pay with a currency associated with the social network, or with a corresponding amount of hard currency if the player does not have any stored currency associated with the social network.

In an embodiment, the player is given the option to purchase certain boosters when failing a level. Specific boosters that are particularly effective on a certain level can be suggested. This is done to increase monetisation and help players overcome difficult levels.

It is also possible to have offers directed at specific groups of players, such as the ones who have not previously purchased anything. In some implementations, players who have not purchased anything will get an initial offer that is discounted from the standard price, in order to incentivise them to start making purchases in-game.

The currency used for purchases can be hard currency, soft currency or it can be based on in-game score. The currency can be associated with a social network to which the game is connected.

Some embodiment allow for the game state and for instance results of past levels and score to be synchronised between different devices or platforms. The synchronisation can happen while playing the game, if the player is connected, or it can be synced at certain times when the player chooses to connect to the game server. It is also possible for the player to play the game entirely in offline mode, but in that case there won't be real-time data available that relates to for instance the performance of other players. In a typical implementation, synchronisation of game progression between platforms can only happen when the player is connected to the game server.

The game can for instance be played in an offline mode on a handheld device using locally stored information on the handheld device. The device can store all or some of the levels that are available for the player to play in the game. Some of the features in the game can be locally run on the device and dependent on the local machine. Other features, such as data related to other players, will not be available in real time when playing offline, but rather gathered a certain points in time. One example of a locally run feature can for instance be that if the game is implemented to regenerate lives after a certain period of time, then the time can be locally decided based on the clock on the device. In some implementations, the central game server clock can override the local clock when the local device is or has been synchronised with the server.

A game can be implemented so that the player knows if it has synchronised the available data with the central server or servers. This can for instance be through a coloured symbol or a check mark that indicates that the information is up to date. The servers with which the game can synchronise include but are not limited to; a server running the game, servers hosting a social network to which the game is connected and a server hosting other games the player is active on.

The game can also indicate if it has been able to establish a connection with the central server for synchronisation or if for instance the network connection is down. That the device is offline can for instance be illustrated with a greyed out icon.

In an embodiment, players can be rewarded for playing the game on multiple platforms. For instance, players that active on a computer-based platform could get a bonus for also installing the game on a handheld device. Such bonus may for instance be in the form of in-game currency, a booster to be used in the game or other in-game valuable object.

Players can also be rewarded for playing multiple games that are related, for instance games from the same developer. When choosing to play a new game, the player can receive bonuses in another game. This can be triggered by using a link from one game to the other, or by games sharing information between one other so that it automatically detects a player that is playing more than one game and subsequently rewards them. One way of rewarding players that play multiple games and/or play games on multiple platforms can be to give access to certain missions that are only available after fulfilling certain such criteria.

It is also possible that games may have elements in common that enables certain objects, for instance boosters, to be usable in multiple games. These games can be located on the same or on different servers. In some implementations, a booster bought in one game can be used in another game that shares certain features with it.

An embodiment of an implementation with synchronisation across platforms comprises a first server, for instance one hosting a social network, with a first data store storing data relating to the state of a game. The first server is configured to communicate with a first plurality of devices, such as mobile phones or personal computers, through a first application programming interface, where the first plurality of devices is related to a first computing platform.

A second server is provided, for instance one hosting a game platform, with a second data store storing data relating to the state of the game. The second server is configured to communicate with a second plurality of devices, such as mobile phones or personal computers, through a second application programming interface, where the second plurality of devices is related to a second computing platform.

A third server with a third data store is provided, configured to communicate with the first and the second server. The three servers are configured to synchronise the three data stores in such a way that when synchronized, the first, second and third data store all relate to a synchronised game state.

It is possible for implementations of the game to vary depending on the location of the player. For instance, the language can be adapted and translated into different languages. It can also be so that updates of the game are incorporated at different times in different locations, in order to not interfere with for instance the times of the day that players are as most active.

If trying to access the game online, as opposed to starting a local version that is saved on the device, while updates are being made, the player can be provided with a message saying that the game cannot be accessed right at that moment.

A person skilled in the art will realise that the different approaches to implementing the game are not exhaustive, and what is described herein are certain preferred embodiments. It is possible to implement the way in a number of variations without departing from the spirit or scope of the invention.

The invention claimed is:

1. A computer device comprising:
   a computer storage holding a plurality of identifiers, each associated with an address;
   an interface connected to receive from a first computer device, game data relating to a completed first board of a game, the first completed board comprising a set of tiles with which a first player has interacted; and
   a processor configured to receive the game data to access an address associated with a player identifier and to formulate a message for transmission to a second computer device identified by the address, the message including the game data relating to the completed first board of the game, said game data for generating an interactive game board corresponding to the completed first board at the second computer device, whereby a second player at the second computer device receives the message and views the interactive game board prior to accepting an invitation to play the game.

2. A computer device as claimed in claim 1, wherein the interface connected to receive a player identifier identifies the player at the second computer device.

3. A computer device as claimed in claim 2, wherein the processor is configured to match a player at the first computer device with one of the player identifiers.

4. A computer device as claimed in claim 1, wherein the message for transmission to a second computer device comprises a component for display at the second computer device, the component identifying a player at the first computer device.

5. A computer device as claimed in claim 4, wherein the component for display is a text component.

6. A computer device as claimed in claim 4, wherein the component for display includes a score derived from the game data.

7. A computer device as claimed in claim 1, wherein the processor is configured to transmit the message to multiple second computer devices.

8. A computer device as claimed in 7, wherein the processor is configured to receive multiple game boards from the first computer device and to transmit a respective message to each of multiple second computer devices.

9. A computer device as claimed in claim 1, wherein the game data relates to a word game wherein the tiles are letter tiles of which the player has selected adjoining tiles to form each of a plurality of words.

10. A computer device as claimed in claim 9, wherein letter tiles which are not used are subsequently scrambled.

11. A computer implemented method comprising at least one processor configured to:
   receive from a first computer device, game data relating to a completed first board of a game, the completed first board comprising a set of tiles with which a first player has interacted;
   access an address associated with a stored player identifier, and
   formulate a message for transmission to a second computer device identified by the address, the message including the game data relating to the completed first board, said game data for generating an interactive game board corresponding to the completed first board at the second computer device whereby a second player at the second computer device receives the message and views the interactive game board prior to accepting an invitation to play the game.

12. A method according to claim 11, wherein the player identifier identifies the player at the second computer device.

13. A method according to claim 12, wherein the processor is configured to match a player at the first computer device with one of the player identifiers.

14. A method according to claim 11, wherein the message formulated for transmission to a second computer device comprises a component for display at the second computer device, the component identifying a player at the first computer device.

15. A method according to claim 14, wherein the component for display is a text component.

16. A method according to claim 14, wherein the component for display includes a score derived from the game data.

17. A method according to claim 11, wherein the processor is configured to transmit the message to multiple second computer devices.

18. A method according to claim 17, wherein the processor is configured to receive multiple game boards from the first computer device and to transmit a respective message to each of multiple second computer devices.

19. A method according to claim 11, wherein the game data relates to a word game wherein the tiles are letter tiles of which the player has selected adjoining tiles to form each of a plurality of words.

20. A method according to claim 19, wherein letter tiles which are not used are subsequently scrambled.

21. A non-transitory computer readable storage device storing instructions that, when executed by at least one processor, causes said at least one processor to perform the following steps:
   receive from a first computer device, game data relating to a completed first board of a game, the board comprising a set of tiles with which a first player has interacted;
   access an address associated with a stored player identifier, and
   to formulate a message for transmission to a second computer device identified by the address, the message including the game data relating to the completed first board, whereby a second player at the second computer device receives the message prior to accepting an invitation to play the game.

* * * * *